(12) United States Patent
Chhabra et al.

(10) Patent No.: US 7,509,279 B2
(45) Date of Patent: Mar. 24, 2009

(54) METHOD AND SYSTEM FOR COMPUTING PATH DEPENDENT PROBABILITIES OF ATTAINING FINANCIAL GOALS

(75) Inventors: Ashvin Bonafede Chhabra, Old Greenwich, CT (US); Alexander G. Zaharoff, Weston, CT (US)

(73) Assignee: Riskmetrics Group, Inc., New York, NY (US)

( * ) Notice: Subject to any disclaimer, the term of this patent is extended or adjusted under 35 U.S.C. 154(b) by 299 days.

(21) Appl. No.: 11/279,951

(22) Filed: Apr. 17, 2006

(65) Prior Publication Data

US 2006/0190372 A1    Aug. 24, 2006

(51) Int. Cl.
*G06Q 40/00* (2006.01)
(52) U.S. Cl. .................................... 705/36 R; 705/36
(58) Field of Classification Search ............... 705/10–44
See application file for complete search history.

(56) References Cited

U.S. PATENT DOCUMENTS

| | | | |
|---|---|---|---|
| 3,634,669 A | 1/1972 | Wyckoff et al. |
| 4,254,474 A | 3/1981 | Cooper et al. |
| 4,346,442 A | 8/1982 | Musmanno |
| 4,355,372 A | 10/1982 | Goldberg |
| 4,376,978 A | 3/1983 | Musmanno |
| 4,597,046 A | 6/1986 | Musmanno et al. |
| 4,598,367 A | 7/1986 | DeFrancesco et al. |
| 4,642,768 A | 2/1987 | Roberts |
| 4,674,042 A | 6/1987 | Hernandez et al. |
| 4,674,044 A | 6/1987 | Kalmus et al. |
| 4,736,294 A | 4/1988 | Le Grand |
| 4,739,478 A | 4/1988 | Roberts et al. |
| 4,760,604 A | 7/1988 | Cooper |
| 4,774,663 A | 9/1988 | Musmanno et al. |
| 4,831,526 A | 5/1989 | Luchs |
| 4,859,187 A | 8/1989 | Peterson |
| 4,866,634 A | 9/1989 | Reboh |
| 4,897,811 A | 1/1990 | Scofield |
| 4,972,504 A | 11/1990 | Daniel, Jr. |
| 5,041,972 A | 8/1991 | Frost |
| 5,093,907 A | 3/1992 | Hwong et al. |

(Continued)

FOREIGN PATENT DOCUMENTS

EP           0597316           5/1994

(Continued)

OTHER PUBLICATIONS

Roger et al., A Credit Scoring Model to Evaluate the Credit Worthiness of Credit Card Applicants, Developments in Marketing Science, vol. 5, 1982.

(Continued)

*Primary Examiner*—Frantzy Poinvil
(74) *Attorney, Agent, or Firm*—Hunton & Williams LLP

(57) ABSTRACT

A method and system for computing the probability of attaining one or multiple financial goals is disclosed. Each goal is analyzed and reduced to a series of cash flows. A threshold criterion of success is established. A plurality of paths are generated. Each path is checked on the basis of the success criterion established earlier and those that do not meet the success criterion are considered failures. The probability of success is a function of the paths that are not failures.

1 Claim, 20 Drawing Sheets

U.S. PATENT DOCUMENTS

| | | | |
|---|---|---|---|
| 5,220,500 A | 6/1993 | Baird | |
| 5,227,874 A | 7/1993 | Von Kohorn | |
| 5,231,571 A | 7/1993 | D'Agostino | |
| 5,245,535 A | 9/1993 | Weiss et al. | |
| 5,278,451 A | 1/1994 | Adiano | |
| 5,297,032 A | 3/1994 | Trojan et al. | |
| 5,321,933 A | 6/1994 | Seifert et al. | |
| 5,381,470 A | 1/1995 | Cambray et al. | |
| 5,396,621 A | 3/1995 | MacGregor et al. | |
| 5,444,844 A | 8/1995 | Inoue | |
| 5,481,647 A | 1/1996 | Brody | |
| 5,490,060 A | 2/1996 | Malec | |
| 5,502,805 A | 3/1996 | Anderson et al. | |
| 5,523,942 A | 6/1996 | Tyler et al. | |
| 5,550,734 A | 8/1996 | Tater | |
| 5,551,021 A | 8/1996 | Harada | |
| 5,583,778 A | 12/1996 | Wind | |
| 5,592,590 A | 1/1997 | Jolly | |
| 5,603,025 A | 2/1997 | Tabb | |
| 5,606,496 A | 2/1997 | D'Agostino | |
| 5,611,052 A | 3/1997 | Dykstra | |
| 5,615,109 A | 3/1997 | Eder | |
| 5,615,341 A | 3/1997 | Srikant | |
| 5,623,591 A | 4/1997 | Cseri | |
| 5,644,727 A | 7/1997 | Atkins | |
| 5,649,116 A | 7/1997 | McCoy | |
| 5,655,085 A | 8/1997 | Ryan | |
| 5,657,437 A | 8/1997 | Bishop et al. | |
| 5,657,460 A | 8/1997 | Egan et al. | |
| 5,664,127 A | 9/1997 | Anderson et al. | |
| 5,671,363 A | 9/1997 | Cristofich et al. | |
| 5,675,746 A | 10/1997 | Marshall | |
| 5,689,650 A | 11/1997 | McClelland et al. | |
| 5,717,865 A | 2/1998 | Stratmann | |
| 5,721,847 A | 2/1998 | Johnson | |
| 5,727,161 A | 3/1998 | Purcell, Jr. | |
| 5,732,397 A | 3/1998 | DeTore | |
| 5,758,328 A | 5/1998 | Giovannoli | |
| 5,764,923 A | 6/1998 | Tallman et al. | |
| 5,765,144 A | 6/1998 | Larche | |
| 5,768,158 A | 6/1998 | Adler et al. | |
| 5,774,878 A | 6/1998 | Marshall | |
| 5,774,883 A | 6/1998 | Andersen et al. | |
| 5,799,286 A | 8/1998 | Morgan et al. | |
| 5,802,502 A | 9/1998 | Gell | |
| 5,812,988 A * | 9/1998 | Sandretto | 705/36 R |
| 5,819,237 A | 10/1998 | Garman | |
| 5,842,178 A | 11/1998 | Giovannoli | |
| 5,848,400 A | 12/1998 | Chang | |
| 5,852,811 A | 12/1998 | Atkins | |
| 5,870,721 A | 2/1999 | Norris | |
| 5,873,096 A | 2/1999 | Lim | |
| 5,875,437 A | 2/1999 | Atkins | |
| 5,878,258 A | 3/1999 | Pizi | |
| 5,878,403 A | 3/1999 | Agrawal | |
| 5,913,202 A | 6/1999 | Motoyama | |
| 5,918,217 A | 6/1999 | Maggioncalda | |
| 5,920,848 A | 7/1999 | Schutzer et al. | |
| 5,930,775 A | 7/1999 | McCauley | |
| 5,940,811 A | 8/1999 | Norris | |
| 5,940,812 A | 8/1999 | Tengel et al. | |
| 5,950,175 A | 9/1999 | Austin | |
| 5,963,953 A | 10/1999 | Cram et al. | |
| 5,970,467 A | 10/1999 | Alavi | |
| 5,974,396 A | 10/1999 | Anderson | |
| 5,978,779 A | 11/1999 | Stein et al. | |
| 5,983,206 A | 11/1999 | Oppenheimer | |
| 5,987,434 A | 11/1999 | Libman | |
| 5,991,741 A | 11/1999 | Speakman et al. | |
| 5,995,942 A | 11/1999 | Smith et al. | |
| 5,999,907 A | 12/1999 | Donner | |
| 6,008,817 A | 12/1999 | Gilmore, Jr. | |
| 6,009,415 A | 12/1999 | Shurling et al. | |
| 6,018,722 A | 1/2000 | Ray et al. | |
| 6,021,397 A | 2/2000 | Jones et al. | |
| 6,026,370 A | 2/2000 | Jermyn | |
| 6,029,139 A | 2/2000 | Cunningham et al. | |
| 6,029,195 A | 2/2000 | Herz | |
| 6,032,125 A | 2/2000 | Ando | |
| 6,044,371 A | 3/2000 | Person et al. | |
| 6,055,510 A | 4/2000 | Henrick | |
| 6,055,517 A * | 4/2000 | Friend et al. | 705/36 R |
| 6,064,985 A | 5/2000 | Anderson | |
| 6,070,147 A | 5/2000 | Harms et al. | |
| 6,073,115 A | 6/2000 | Marshall | |
| 6,076,072 A | 6/2000 | Libman | |
| 6,078,892 A | 6/2000 | Anderson et al. | |
| 6,078,901 A | 6/2000 | Ching | |
| 6,088,686 A | 7/2000 | Walker et al. | |
| 6,092,050 A | 7/2000 | Lungren et al. | |
| 6,097,391 A | 8/2000 | Wilcox | |
| 6,108,641 A | 8/2000 | Kenna et al. | |
| 6,122,623 A | 9/2000 | Garman | |
| 6,154,731 A | 11/2000 | Monks et al. | |
| 6,173,270 B1 | 1/2001 | Cristofich et al. | |
| 6,185,582 B1 | 2/2001 | Zellweger et al. | |
| 6,188,403 B1 | 2/2001 | Sacerdoti et al. | |
| 6,188,405 B1 | 2/2001 | Czerwinski et al. | |
| 6,188,993 B1 | 2/2001 | Eng et al. | |
| 6,195,092 B1 | 2/2001 | Dhond et al. | |
| 6,199,077 B1 | 3/2001 | Inala et al. | |
| 6,202,053 B1 | 3/2001 | Christiansen et al. | |
| 6,205,453 B1 | 3/2001 | Tucker et al. | |
| 6,212,494 B1 | 4/2001 | Boguraev | |
| 6,222,557 B1 | 4/2001 | Pulley, IV et al. | |
| 6,236,978 B1 | 5/2001 | Tuzhilin | |
| 6,243,093 B1 | 6/2001 | Czerwinski et al. | |
| 6,249,775 B1 | 6/2001 | Freeman et al. | |
| 6,256,649 B1 | 7/2001 | Mackinlay et al. | |
| 6,263,320 B1 | 7/2001 | Danilunas et al. | |
| 6,269,346 B1 | 7/2001 | Cristofich et al. | |
| 6,271,863 B1 | 8/2001 | Bose et al. | |
| 6,278,981 B1 | 8/2001 | Dembo et al. | |
| 6,282,551 B1 | 8/2001 | Anderson et al. | |
| 6,311,144 B1 | 10/2001 | Abu El Ata | |
| 6,317,726 B1 | 11/2001 | O'Shaughnessy | |
| 6,317,750 B1 | 11/2001 | Tortolani et al. | |
| 6,321,212 B1 | 11/2001 | Lange | |
| 6,349,290 B1 | 2/2002 | Horowitz et al. | |
| 6,349,291 B1 | 2/2002 | Varma | |
| 6,360,188 B1 | 3/2002 | Freidman et al. | |
| 6,363,393 B1 | 3/2002 | Ribitzky | |
| 6,405,204 B1 | 6/2002 | Baker et al. | |
| 6,452,613 B1 | 9/2002 | Lefebvre et al. | |
| 6,490,569 B1 | 12/2002 | Grune et al. | |
| 6,496,832 B2 | 12/2002 | Chi et al. | |
| 6,502,080 B1 | 12/2002 | Eichorst et al. | |
| 6,513,018 B1 | 1/2003 | Culhane | |
| 6,597,379 B1 | 7/2003 | Morris et al. | |
| 6,601,044 B1 | 7/2003 | Wallman | |
| 6,725,257 B1 | 4/2004 | Cansler et al. | |
| 6,741,975 B1 | 5/2004 | Nakisa et al. | |
| 6,850,923 B1 | 2/2005 | Nakisa et al. | |
| 6,985,880 B1 | 1/2006 | Hodgdon et al. | |
| 2001/0011243 A1 | 8/2001 | Dembo et al. | |
| 2001/0056398 A1 | 12/2001 | Scheirer | |
| 2002/0007330 A1 | 1/2002 | Kumar et al. | |
| 2002/0019791 A1 | 2/2002 | Goss et al. | |
| 2002/0019803 A1 | 2/2002 | Muller | |
| 2002/0059139 A1 | 5/2002 | Evans | |
| 2002/0067373 A1 | 6/2002 | Roe et al. | |
| 2002/0073005 A1 | 6/2002 | Welnicki et al. | |
| 2002/0078086 A1 | 6/2002 | Alden et al. | |
| 2002/0111850 A1 | 8/2002 | Smrckas et al. | |

| | | | |
|---|---|---|---|
| 2002/0111890 A1 | 8/2002 | Sloan et al. |
| 2002/0133383 A1 | 9/2002 | Chao et al. |
| 2002/0147668 A1 | 10/2002 | Smith et al. |
| 2002/0198797 A1 | 12/2002 | Cooper et al. |
| 2003/0018492 A1 | 1/2003 | Carlson |
| 2003/0028466 A1 | 2/2003 | Jenson et al. |
| 2003/0061132 A1 | 3/2003 | Yu, Sr. et al. |
| 2003/0061137 A1 | 3/2003 | Leung et al. |
| 2003/0093351 A1 | 5/2003 | Sarabanchong |
| 2003/0212628 A1 | 11/2003 | Kuttan et al. |
| 2003/0216965 A1 | 11/2003 | Libman |
| 2004/0030626 A1 | 2/2004 | Libman |
| 2004/0039588 A1 | 2/2004 | Libman |
| 2004/0054610 A1 | 3/2004 | Amstutz et al. |
| 2004/0236641 A1 | 11/2004 | Abbott et al. |
| 2004/0267651 A1 | 12/2004 | Jenson et al. |
| 2005/0004855 A1 | 1/2005 | Jenson et al. |
| 2005/0004856 A1 | 1/2005 | Brose et al. |
| 2005/0010510 A1 | 1/2005 | Brose et al. |
| 2005/0027632 A1 | 2/2005 | Zeitoun et al. |
| 2005/0060252 A1 | 3/2005 | Doddington |
| 2005/0144108 A1 | 6/2005 | Loeper |

FOREIGN PATENT DOCUMENTS

| | | |
|---|---|---|
| WO | WO 00/02256 | 1/2000 |
| WO | WO 02/069212 | 9/2002 |

OTHER PUBLICATIONS

Pourmokhtar, A Hedge Fund Primer Version 0.1, www.emf.net/?farzin/hedgefund.html, printed Jul. 24, 2002, 5 pages.
At Your Request, www.wingspanbank.com, Sep. 28, 1999.
CSU/DSU (Channel Service Unit/Data Service Unit), CTI (Computer-Telephony Integration), pp. 208-210.
Markese, Can You Trust Mutual Fund Rankings?, Consumers' Research Magazine, vol. 76, No. 10, Research Library, Oct. 1993, p. 20.
Taylor et al., Card Issuers Turn to Scoring as They Face Increasing Risk, Financial Services Report, vol. 8, No. 15, Jul. 24, 1991, p. 1.
Quinn, Credit Card Issuers Keeping a Closer Watch on How You Pay Bills, Washington Post, Staying Ahead, Business Section P6, Apr. 25, 1988, 1 page.
Friedland, Credit Scoring Digs Deeper into Data, Credit World, vol. 84, No. 5, May 1996, pp. 19-23.
Credit Scoring New Markets, Bank Technology News, vol. 9, No. 7, Jul. 1996, p. 1.
Derivatives Primer, CEIBA, Association for Financial Professionals, Committee on Investment of Employee Benefits Assets, Dec. 2001.
Cumby et al., Evaluating the Performance of International Mutual Funds, The Journal of Finance, vol. 45, No. 2, Jun. 1990, pp. 497-521.
Jameson, Expanding Risk Management Strategies: Key to Future Survival, Credit World, vol. 84, No. 5, May 1996, pp. 16-18.
FreeMarkets, printed on Apr. 26, 1999.
Armstrong, Fund of Funds: Perfect Solution or Dangerous Shortcut?, Investor Solutions, Inc., www.investorsolutions.com, printed Jul. 24, 2002.
GS-Calc 6.0.1.1.; JPS Development; http://download.com, printed Sep. 3, 2003.
Gottfried et al., Graphical definitions: making spreadsheets visual through direct manipulation and gestures, Visual Languages, 1997, Proceedings, 1997 IEEE Symposium on, Sep. 23-26, 1997, pp. 246-253, Abstract.
Hedge Fund Primer—The Basics, KSP Capital Management LLC, information@kspcapital.com, printed Jul. 24, 2002, 18 pages.
Hedge Fund Primer About Fund of Funds, Links Securities LLC, www.hedgefund.net/prime_fof.php3, 2002, 2 pages.
Kneis, Hedge Fund Strategies: A Primer, Canadianhedgewatch, p. 3.
Buchner et al., HotDoc: a flexible framework for spatial composition, Visual Languages, 1997, Proceedings, 1997 IEEE Sympsium, Abstract, Sep. 23-26, 1997, pp. 92-99.
Asch, How the RMA/Fair Isaac credit-scoring model was built, Journal of Commercial Lending, vol. 77, No. 10, Jun. 1995, pp. 10-16.
Huddling With William Bernstein: Small Town Doctor, Investing Pro.
Snyder et al., Indentifying design requirements using analysis structures, Aerospace and Electronics Conference, 1991, NAECON, 1991, vol. 2, Abstract, May 20-24, 1991, pp. 786-792.
Meredith, Internet bank moves closer to virtual reality, USA Today, May 5, 1995.
Internet, Lending Tree, Mortgage Apply Online in Minutes, www.lendingtree.com, 7 pages, printed Feb. 1, 1999.
Makuch, Managing Consumer Credit Delinquency in the US Economy: A Multi-Billion Dollar Management Science Application, Interfaces, Feb. 1992, pp. 90-109.
Bogle, Mutual Funds at the Millennium: Fund Directors and Fund Myths, The Vanguard Group to the '40 Act Institute of PLI (Practicing Law Institute), New York, NY, May 15, 2000, 15 pages.
Davenport et al., Numbers-a medium that counts [spreadsheet software]; Computer Graphics and Applications; IEEE; vol. 11; Issue 4; Abstract, Jul. 1991, pp. 39-44.
Opportunity Knocks at Scoring's Door, Collection and Credit Risk, vol. 2, No. 4, Apr. 1997, p. 53.
Stolte et al., Polaris: a system for query, analysis, and visualization of multidimensional relational databases; Visualization and Computer Graphics; IEEE Transactions on; vol. 8; Issue 1; Abstract, Jan./Mar. 2002, pp. 52-65.
Primer: Derivatives Instruments, Derivatives Study Center, www.econstrat.org/dscinstruments.htm, printed Jul. 24, 2002, 8 pages.
Chi et al., Principles for information visualization spreadsheets; Computer Graphics and Applications; IEEE; vol. 18; Issue 4; Abstract, Jul./Aug. 1998, pp. 92-99.
Product Data Integration Technologies, Inc., Step Integratin Authors, printed on Apr. 26, 1999.
Sullivan, Scoring Borrower Risk, Mortage Banking, vol. 55, No. 2, Nov. 1994, pp. 94-98.
Spreadsheet Mapper; www.panopticon.com., printed Oct. 1, 2003.
TCS 4.20; Telsys sas; http://download.com, printed Sep. 30, 2003.
McLaughlin, Tapping Web to Search for Right Fund—FundProfiler Speeds Search, Boston Herald, Boston, MA, Dec. 16, 1999, p. 70.
Carey, The Sub-Prime Credit Market: Identifying Good Risks for Unsecured Cards, Credit World, vol. 85, No. 1, Sep. 1996, pp. 13-15.
Portner, There Must be a Better Way, Mortgage Banking, vol. 53, No. 2, Nov. 1, 1992, pp. 12-22.
Trading and Capital-Markets Activities Manual, Instrument Profiles: Structured Notes, Federal Reserve System, The Turin Group, www.toerien.com/books/manual/4040.htm, printed Jul. 24, 2002, 14 pages.
Storms, Phillip, Using Mortgage Credit to Achieve Client Objectives, Journal of Financial Planning, ISSN/ISBN: 10403981, Proquest Document ID: 10403981, vol. 9, Issue 5, 9 pages, Oct. 1996.
Storms, Phillip, Using Mortgage Credit to Achieve Client Objectives, Journal of Financial Planning, ISSN/ISBN: 10403981; Proquest document ID:10403981; Denver: vol. 9; Issue 5; 9 pages, Oct. 1996.
Hickman, Using Software to Soften Big-Time Competition, Bank Systems and Technology, vol. 31, No. 8, Jun. 1994, pp. 38-40.
Spoerri, Visual tools for information retrieval; Visual Languages; 1993; Proceedings; 1993 IEEE Symposium on; pp. 160-168; Abstract.
Spirer, When Bad Credit Behavior Becomes the Norm, Credit World, vol. 85, Iss. 6, Jul./Aug. 1997, p. 18.
Why A Fund of Funds?, Altegris Investments, www.managedinvestments.com/hedge_fund_of_funds, printed Jul. 24, 2002.

* cited by examiner

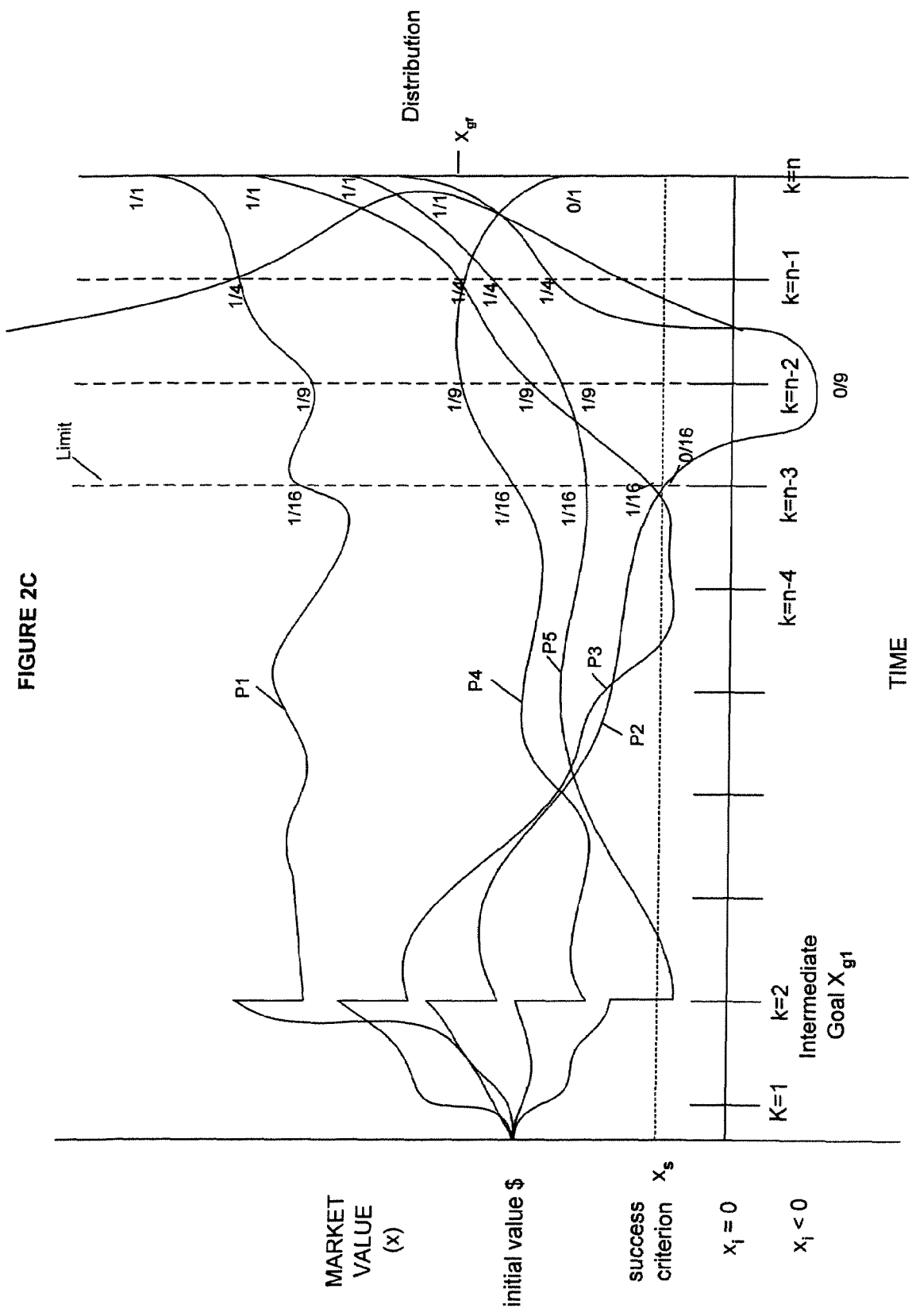

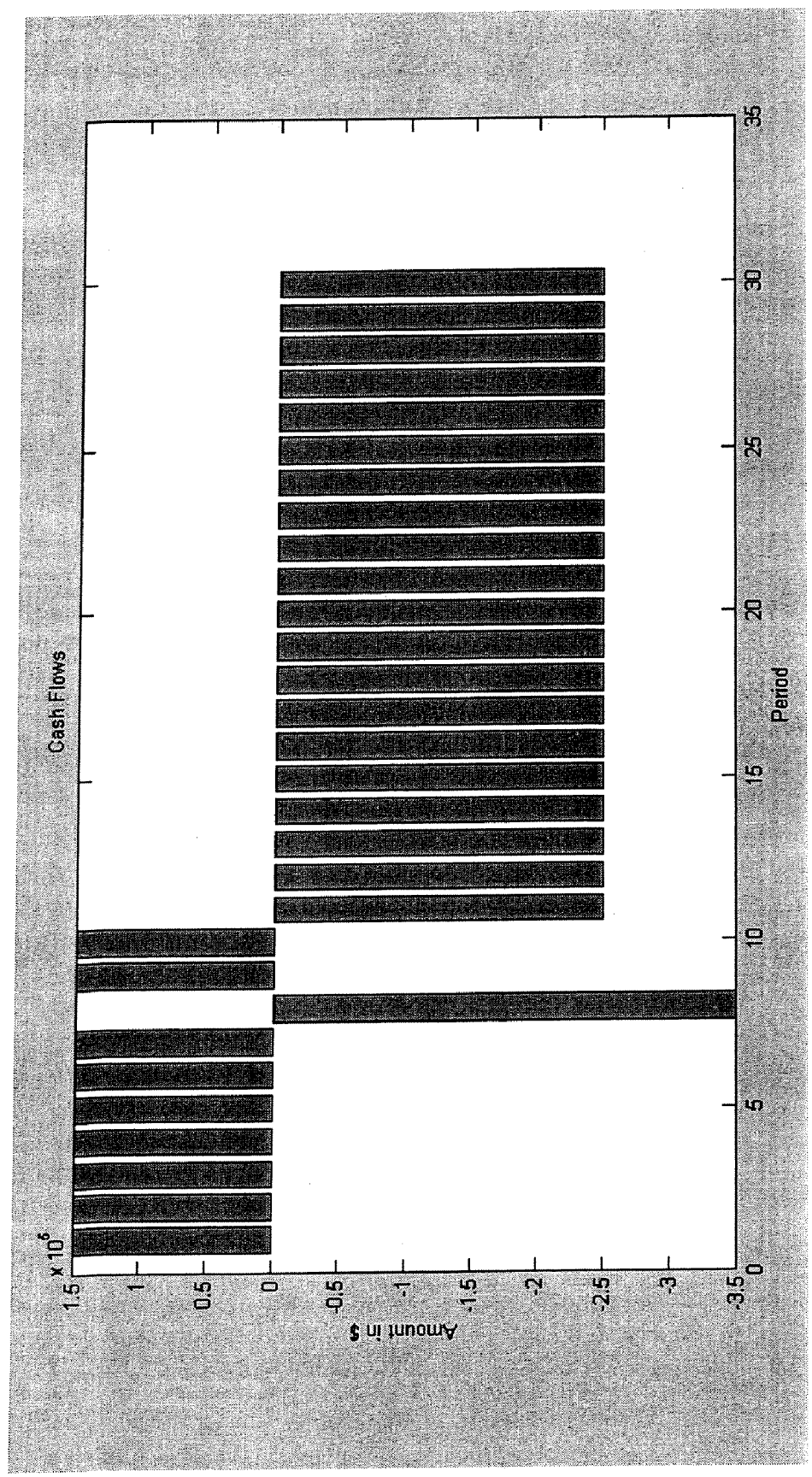
FIGURE 2D – CASH FLOWS

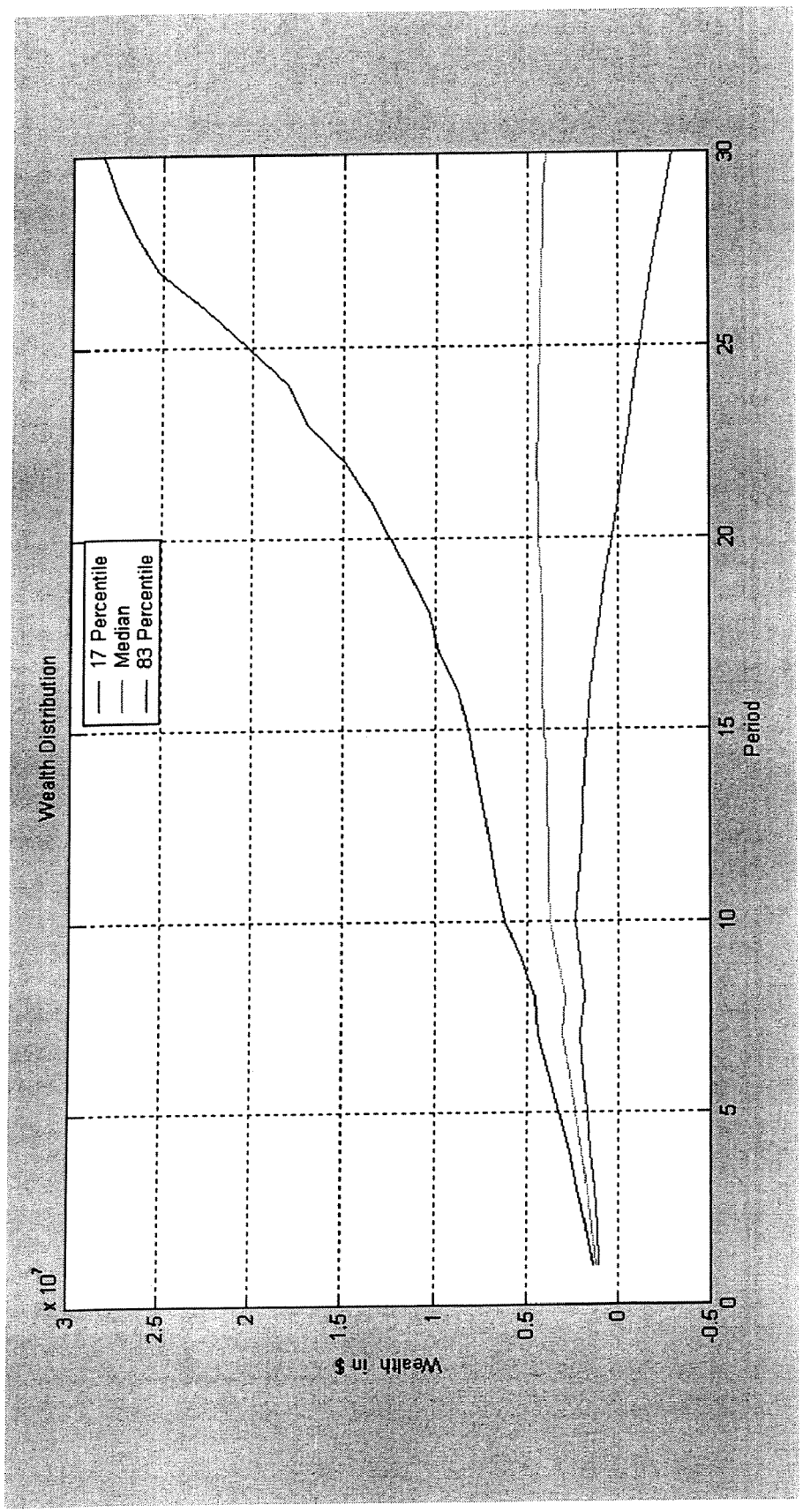
FIGURE 2E – WEALTH PROJECTION

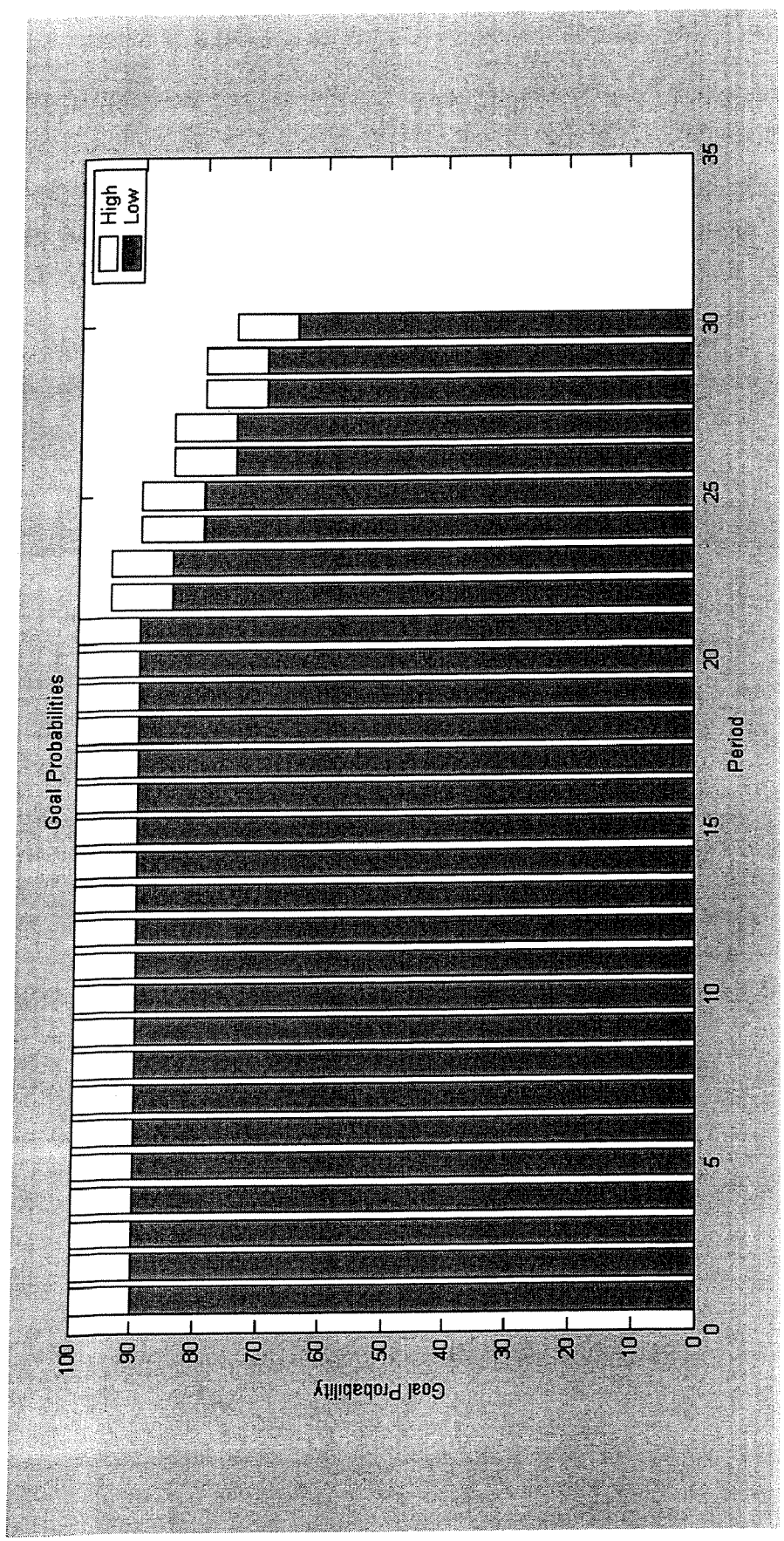
FIGURE 2F – GOAL PROBABILITIES

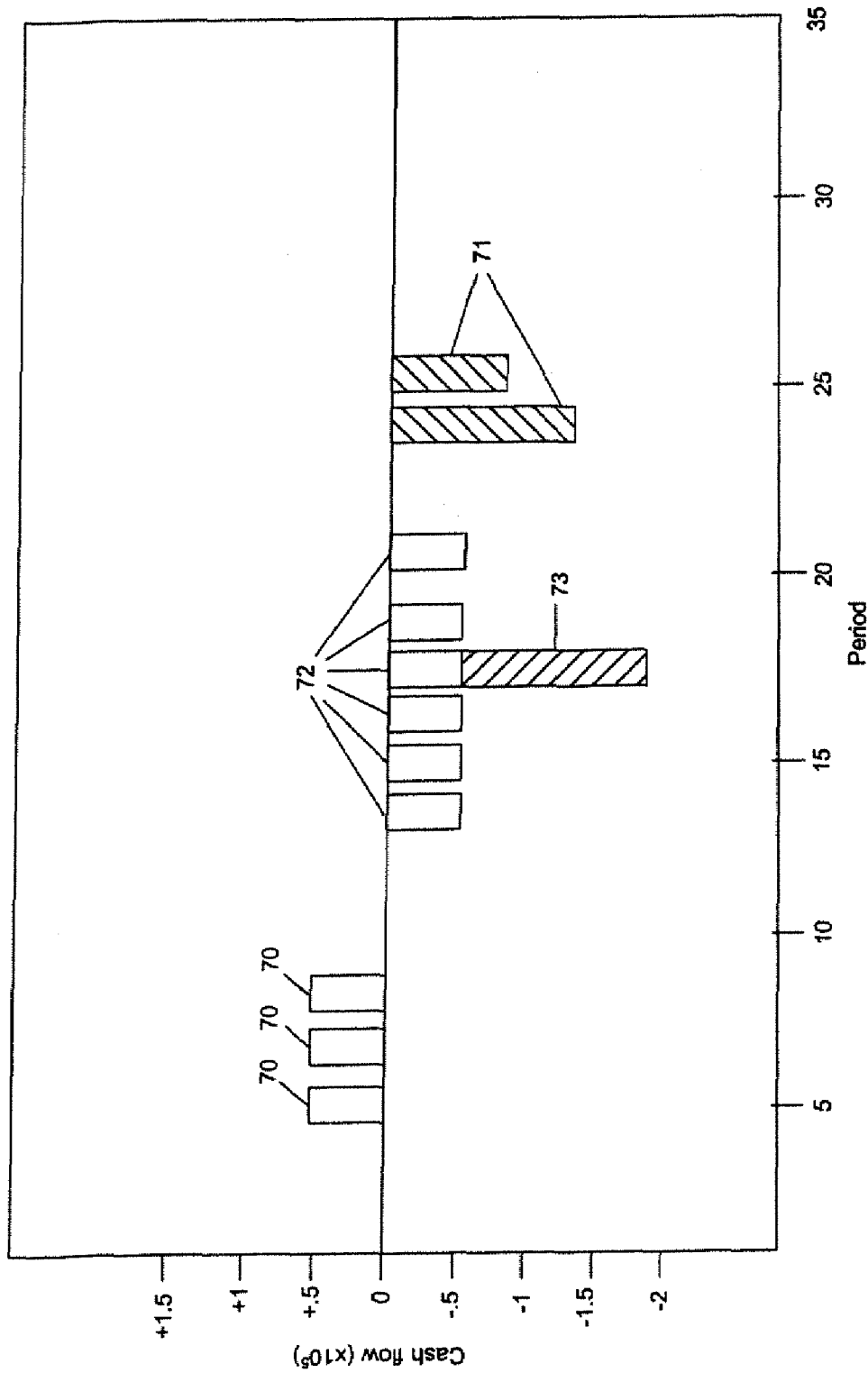

METHOD AND SYSTEM FOR COMPUTING PATH DEPENDENT PROBABILITIES OF ATTAINING FINANCIAL GOALS

FIELD OF THE INVENTION

The present invention relates to a method and system for utilizing a computer to generate financial advice, and more particularly to a method and system for determining statistical wealth projections and/or simultaneous probabilities of meeting defined sets of financial goals.

BACKGROUND OF THE INVENTION

Rapid improvements in computer and communications technology, particularly developments of the Internet, have exponentially increased an individual's ability to access financial data. Contemporaneous changes in legal structures and financial vehicles have also increased the number of investment opportunities available to individuals. The vast amount of financial data and investment opportunities, however, have made it difficult for an investor to determine which investment vehicles will most likely enable the individual to meet his or her investment goals. Moreover, lifestyle and economic changes make it increasingly necessary to prepare for multiple investment goals, such as retirement, educational needs and home ownership. Thus, there exists a need for a method and system of generating financial advice which enables an individual to determine the likelihood that the individual's assets, future estimated savings, and investment plan will satisfy the individual's investment goals.

Traditional systems attempt to predict wealth and/or the likelihood of reaching a financial goal by computing the wealth of the user at some time horizon. One method of predicting future wealth assumes a "fixed" rate of return, and possibly some volatility factor, across time for various asset classes. A calculation is then made to determine a normal distribution of the user's terminal wealth. Multiple goals are handled by creating several phantom accounts, one for each goal. Each phantom account generating a different rate of return, often based on the investment horizon. This method, however, suffers from the drawback that most assets do not generate a "fixed" rate of return, and even those that provide so-called "fixed" returns (under common terminology) are not guaranteed.

Other systems simulate a variety of conditions and then determine the probability of success based on the percentage of wealth distribution being above the goal. For example, one system, offered by Financial Engines, Inc., allows a user to input information, including a desired retirement age and retirement income, a current age, a set of assets indicated as taxable or non-taxable, and future estimated savings. The system breaks down the user's portfolio to various asset classes, such as stocks, bonds and cash. The system then reportedly simulates economic variables over time, such as inflation, interest rates, and asset class returns, and traces thousands of paths the user's portfolio might take until the retirement age is met. After translating each scenario into an annuity and adding any other retirement benefits, the system looks at the terminal value of wealth attained and tallies the number of scenarios that do and do not reach the user's retirement goal (expressed in a dollar amount per year).

These systems, however, fail to simulate certain real life threshold concerns, and fail to optimize for multiple goals. One significant effect of this is to overstate the desirability of an aggressive portfolio in certain situations. For example, the mean of wealth at period T is typically calculated in analytic systems as $e^{\mu T}$ or $e^{(\mu+1/2\sigma^2)T}$ depending on the assumptions made. However, the number of paths that satisfy all intermediate goals and thresholds may decrease with increased volatility. Thus, for an individual having a current portfolio that is close to the individual's threshold, an aggressive, high volatility, portfolio may lead to a number of scenarios in which the portfolio value dips below the threshold—essentially causing a failure. These systems also fail to optimize for individual goals having multiple cash flows across time. Thus, there is a need for a multi-period, path dependent analysis system which optimizes analysis for multiple goals over multiple-periods of time and which accounts for intermediate threshold concerns.

SUMMARY OF THE INVENTION

The present invention addresses these and other deficiencies of the prior art by providing a system and methodology for computing the probability of attaining one or multiple goals. Each goal is analyzed and reduced to a series of probabilistic cash inflows or outflows. These cash flows are time ordered and combined to provide an integrated picture and to enable a computation that allows for the simultaneous achievement of multiple goals. A threshold criterion of success is established which may be supplied by the user or generated by the system, e.g. based on prudent financial planning such as always having a certain minimum amount of money. A plurality of paths, or samples are generated preferably using Monte Carlo sampling, to ascertain an accurate distribution of future wealth. Each path is checked (for a set of periods or time steps) on the basis of the success criterion established earlier, and those that do not meet the success criterion are considered failures. The probability of success is a function of the paths that are not failures.

Because the computation is path dependent, the system can account for the effect that cash spent in attaining a goal in the early years will have on the probability of reaching another goal in the later years. Losses in the early years adversely affect the probability of attaining goals set for the later years. The flexibility of the success criterion allows different users to have different criterion of success depending on their risk preferences.

BRIEF DESCRIPTION OF THE FIGURES

FIGS. 2B and 2C show methods for calculating goal probabilities for simulated scenarios as a function of the paths that are not failures in accordance with the invention;

FIG. 2D is an example of a series of cash flows;

FIG. 2E shows a sample statistical wealth projection;

FIG. 2F shows a sample goal probability calculation in accordance with the invention;

FIG. 2G shows an example of multiple overlapping goals;

DETAILED DESCRIPTION OF THE INVENTION

Figure 1A:
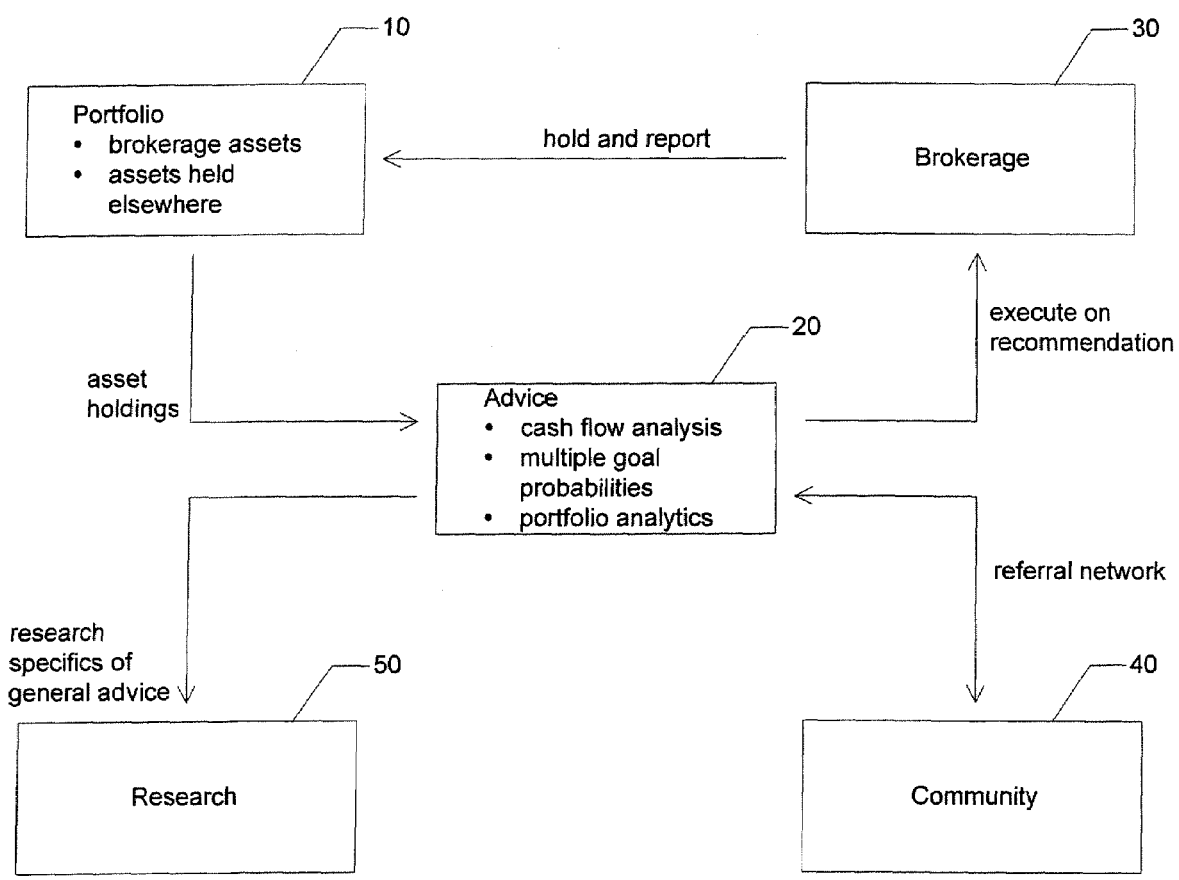
FIG. 1A is a system block diagram showing the components of an integrated system utilizing the present invention.
Figure 1B:
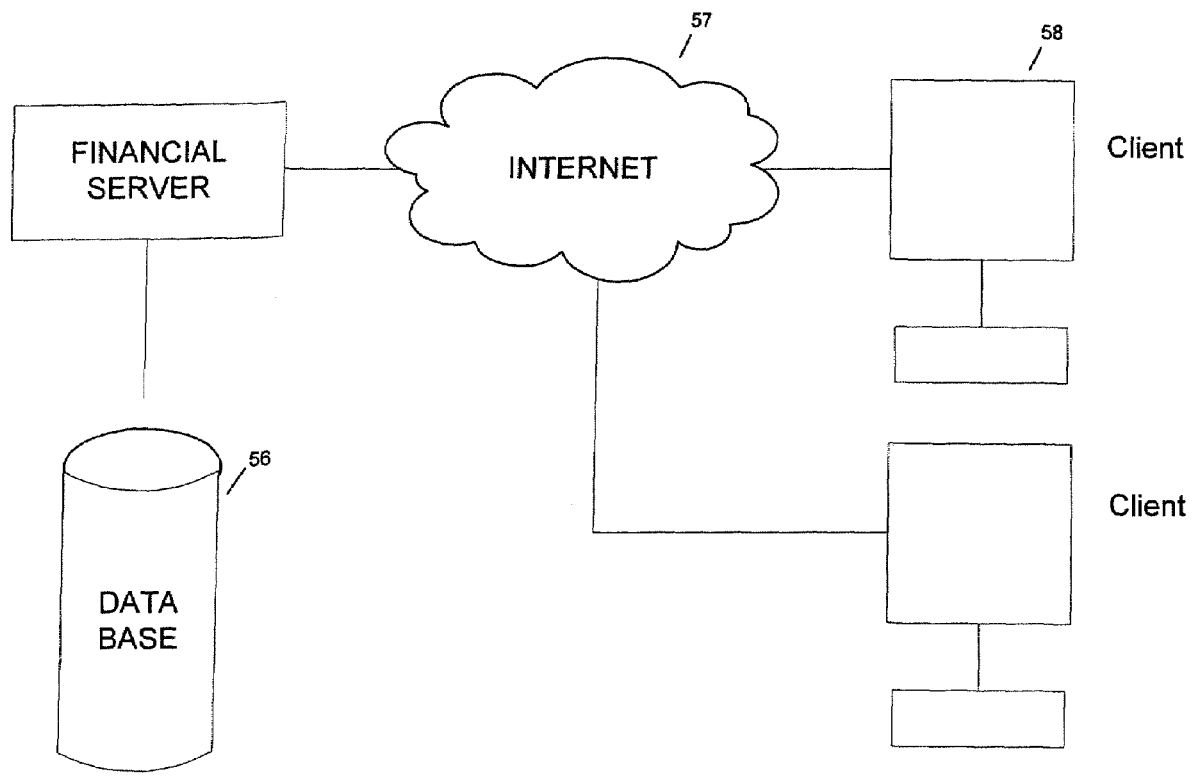
FIG. 1B illustrates an example of a typical computer system upon which an embodiment of the invention may be implemented.

FIG. 1A depicts the various modules and interfaces of an integrated system embodying the present invention. The system is preferably implemented as an Internet site accessible running on a financial server (55, FIG. 1B) accessible via the World-Wide-Web (57, FIG. 1B). A user will typically enter the site amongst other purposes to seek advice on one or more issues, for example, saving for retirement, a home purchase or a child's education. The user may access the site through a user workstation (58, FIG. 1B). The user is prompted to enter relevant information about their portfolio by a portfolio module 10. This information may include, for example, current regular income, savings, asset classes, expenses, and cash flows associated with their financial goals. The system may also prompt the user to input expectations for growth of those cash flows or, alternatively, the system will generate estimated cash flow growth.

The user's asset holdings are input to an advice engine 20 which converts the goals into a series of cash flows, simulates future wealth, analyzes the probabilities of meeting the multiple goals, and provides portfolio analytics. User information is stored on a database (56, FIG. 1B). If the user elects to execute one or more recommendations, a transaction order may be generated and forwarded to a brokerage module 30 which executes the order and reports back to the portfolio module 10 which adjusts the user's assets mix. Alternately, the user may elect to be recommended to a referral network 40 to communicate with a brokerage community. The user may also wish to have direct access to on-line research 50 while analyzing the portfolio.

Figure 2A:
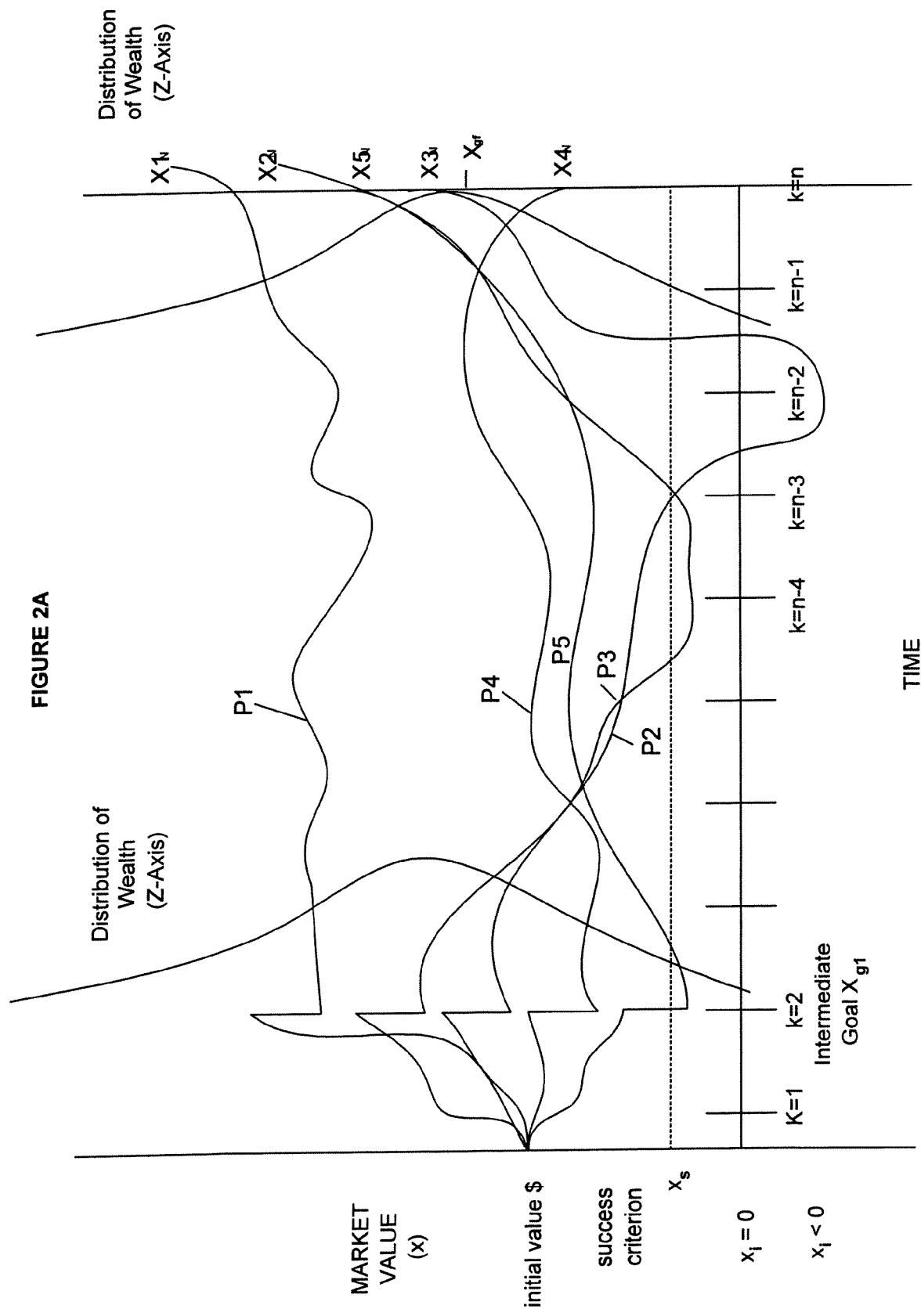
FIG. 2A shows a simulated time line of market values a user's portfolio may take over time.

FIG. 2A shows a simulated time line showing various paths or scenarios (P1, P2, P3, P4 & P5) a user's portfolio market value (x) may take under various simulated conditions over a time period (k=1 to n). FIG. 2A shows two goals, an intermediate goal ($x_{gi}$) at time k=2 and a final goal ($x_{gf}$) at time k=n. A goal may consist of multiple cash flows over multiple periods (not shown), such as, for example, paying for college tuition for a child. Five simulated paths are depicted (P1-P5). A threshold success criterion $x_s$ is also shown. When the simulated market value dips below this threshold the path is considered a failure. Each path starts off with an initial asset value and simulates the value across time periods.

As shown, the market value of each path is reduced by the value of the intermediate goal $x_{gi}$ at time k=2. Thus, the simulation takes into account the effect that cash spent in earlier years has on attaining goals in later years. Path P4 has a final value at period k=n which is less than the final goal $x_{gf}$ and would be considered a "failure." Paths P1-P3 and P5 have final values $x1_n$-$x3_n$ and $x5_n$ which are greater than the final goal $x_{gf}$. However, paths P2, P3 and P5 dip below the success criteria at least one point along the time line and would also be considered "failures." For example the market value of the path P3 dips below the success criteria $x_s$ at period k=n-4; the market value of path P2 actually goes below zero at period k=n-2; and P5 does not have sufficient funds to satisfy intermediate goal $x_{gi}$ at time k=2 without going below the success criterion. Thus, the only simulated path satisfying the intermediate and final goals ($x_{gi}$ and $x_{gf}$), and success criterion ($x_s$), is P1.

As noted above, a goal may consist of multiple cash flows. In an advantageous embodiment, the probability is calculated at the end of each period, but the probability, using the binary of failure/success at any time before, at the last cash flow period corresponding to the goal becomes that goal probability, i.e. it is the probability of achieving that goal subject to achieving all, or a chosen set of, the cash flows before it.

FIG. 2A also shows a distribution of wealth projections at period k=n. This represents the projected wealth of the user at the end of the simulation. In an advantageous embodiment, the distribution may be calculated at the end of each goal, e.g. k=2.

Figure 2B:
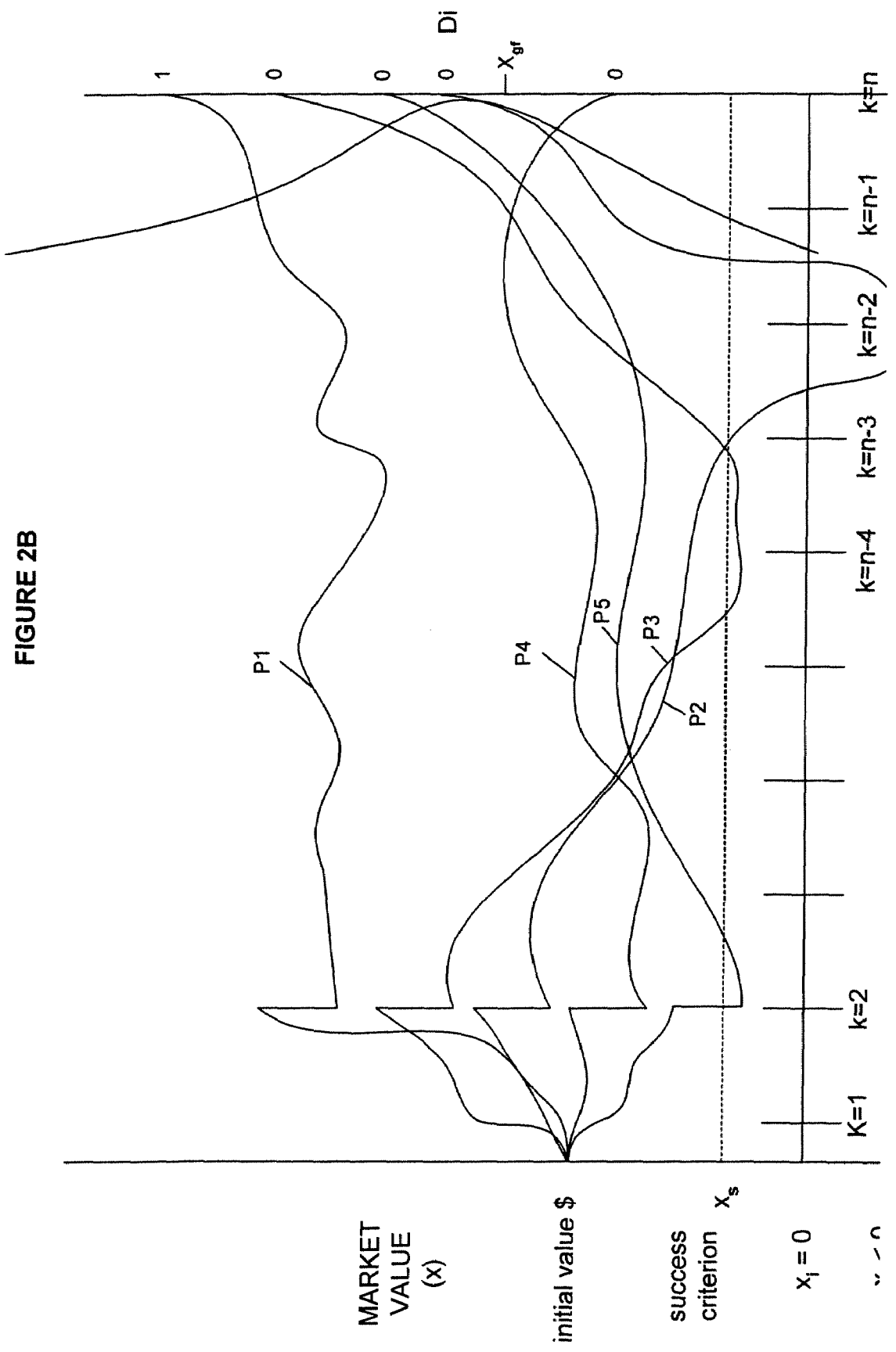

FIGS. 2B-2C show exemplary methods of calculating goal probabilities in accordance with the invention. FIG. 2B shows a binary method for calculating goal probabilities in which a path is assigned a goal probability of 1 if it satisfies all goals and the success criterion for each period, and 0 if it fails to satisfy every goal or the success criterion for every period. Thus, for the simulation shown in FIG. 2B, path P1 has a goal probability of 1. Paths P2-P5 are assigned goal probabilities of 0. Those probabilities may be averaged to give an overall probability of 1 in 5 of satisfying the intermediate and final goals and success criterion.

FIG. 2C shows an application of one type of decaying goal probability function with a limited "memory." Each path is assigned a goal probability equal to (the sum (for i=0 to 3) of $\delta_{n-i}/(i+1)^2$) divided by $(1/1+1/4+1/9+1/16)$, where $\delta_i$ is a function of whether the market value for the path at period (i) satisfies the success criteria. In the example shown, $\delta_i$ equals 1 if the market value of period (i) satisfies the success criterion and 0 if it does not. Thus, the goal probability of path P1=1; P2=$(1/1+1/4+0/9+0/16)/(1/1+1/4+1/9+1/16)$; P3=1; and P4=$(0/1+1/4+1/9+1/16)/(1/1+1/4+1/9+1/16)$. Those goal probabilities may be averaged.

Other mechanisms for assigning goal probabilities will be readily apparent to those of ordinary skill in the art based on the disclosure herein. For example, one may have a decaying function without a "memory." One may define any path which can not satisfy a final and/or intermediate goal as having zero goal probability. One may assign different intermediate numbers depending upon whether a path fails to satisfy a success criterion, as compared to having negative wealth. As a further example, one may assign any of a number of types of delta functions.

FIGS. 2D, 2E and 2F show an exemplary series of cash flows, and a resulting wealth projection and goal probability, respectively. FIG. 2D shows a series of planned incoming cash flows of $150,000 for years 1-7, 9 and 10, and a series of outflow goals for years 8, 11-30. A simulated wealth projection is shown in FIG. 2E, based on an initial set of assets and the cash flows of FIG. 2D. In a preferred embodiment, the system displays the median wealth value, $17^{th}$ percentile wealth value and $83^{rd}$ percentile wealth value. As described below, the wealth projection values are preferably simulated using Monte Carlo simulation. The simulated market values are used to determine the probability that the user will achieve her financial goals (e.g. cash outflows for years 8, 11-30).

FIG. 2G shows an exemplary series of cash inflows 70, and three goals 71, 72 and 73. Goals 71 and 72 each consist of multiple-period cash flows. Goal 73 is a single cash flow that overlaps with goal 72. Success for multiple-period cash flow goals may be defined as meeting the cash flow needs for each period. Thus, for example, for a simulated path to satisfy goal 72 it would have to have sufficient funds to make cash outflows for each of the six periods.

Figure 2H:
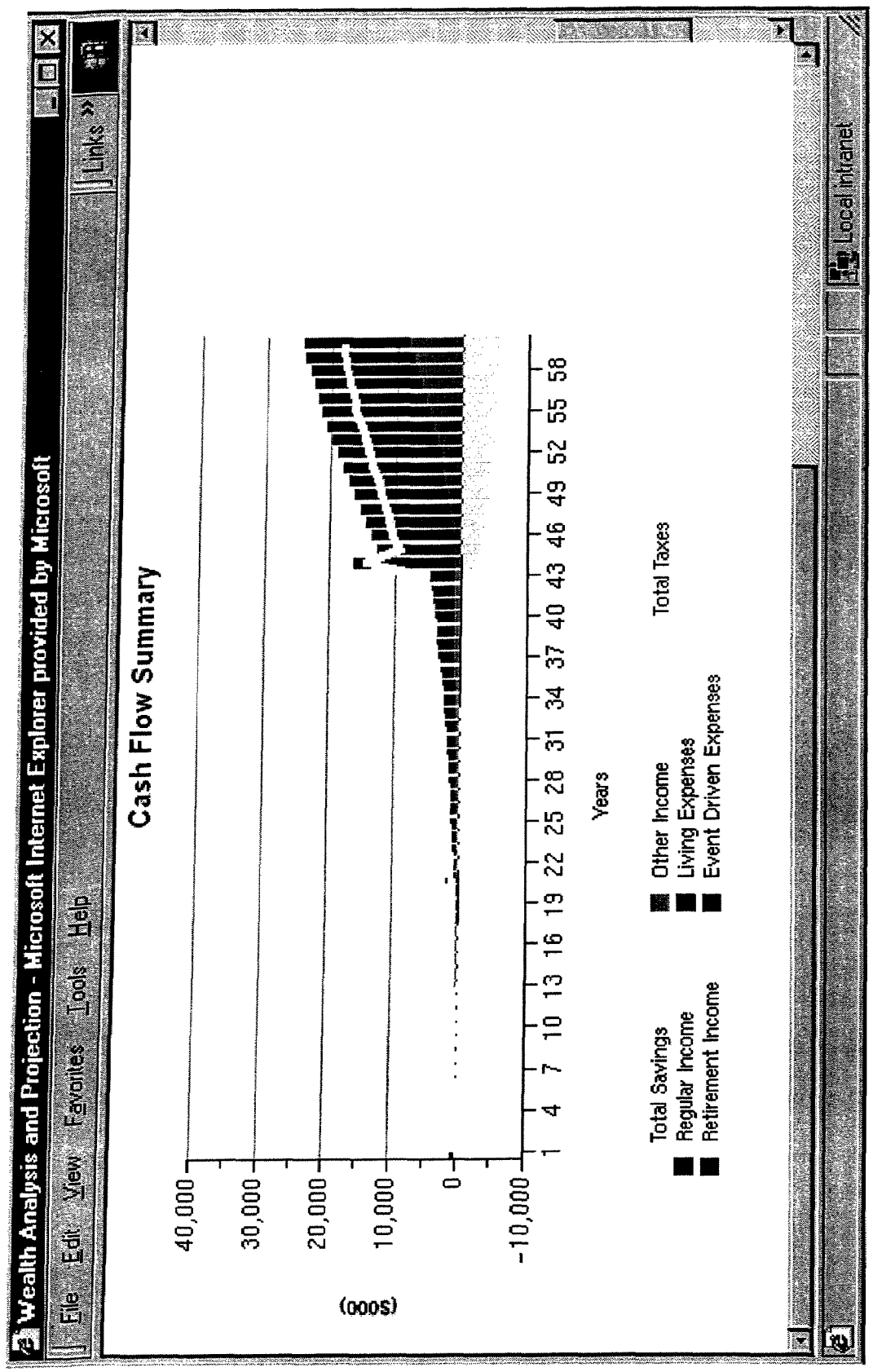
FIG. 2H shows a screen display of showing a plurality of cash inflows and outflows.

FIG. 2H shows a plurality of cash inflows (regular income, retirement income, other income) and a plurality of cash outflows (living expenses and event driven expenses). FIG. 2H also shows the effect of taxes on the wealth projection.

Figure 3:
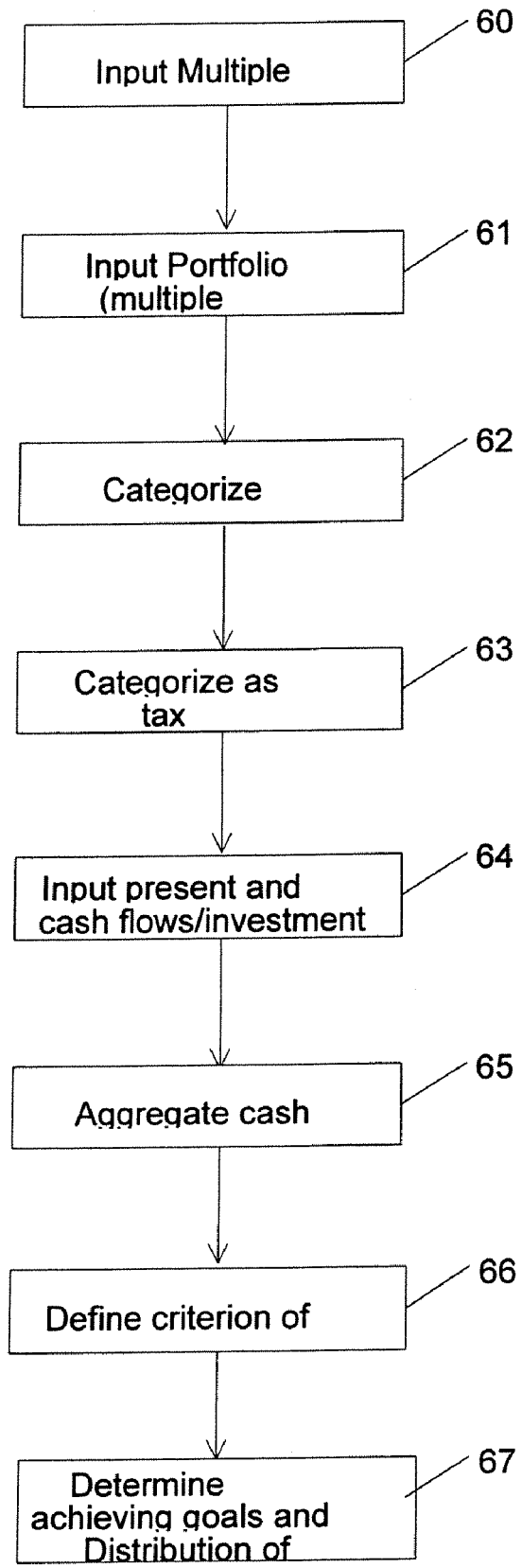
FIG. 3 is a high level flow chart showing an embodiment which divides assets as taxable or tax favored and categorizes assets by asset type.

With reference to FIG. 3, an overview of an advantageous embodiment which divides assets into taxable and tax favored classes and categorizes assets by asset group (e.g. large cap, small cap, international, biotech, high technology, etc.) is discussed.

The user inputs (step 60) the parameters for one or more financial goals into the system. This consists of one or more dollar amounts at specified time frames. These financial goals are converted to cash flows. The user next inputs (step 61) a portfolio of assets. These may be individually added or accessed from one or more links such as via the Web. These variables may include, for example, the market values of taxable and tax exempt assets, the leverage value for taxable and tax exempt assets, and the book value of taxable and tax exempt asset pools. In one advantageous embodiment, the system categorizes (step 62) each asset by the type of financial asset, such as international stock, small cap stock, large cap stock, cash, bonds, etc. This is designed to save computation time by treating similar assets similarly. Depending on the type of client (e.g. individual or institutional), assets may also be advantageously categorized as taxable or tax favored (step 63) (either tax exempt or tax deferred). Present and expected cash flows are inputted or generated (step 64). These include, for example, expected returns for taxable and tax exempt asset pools and individual assets. The cash flows are aggregated on a period by period basis (step 65). Criteria for success are defined (step 66).

Any number of different criteria of success can be established reflecting the different risk tolerances of the investor. "Absolute" thresholds have some arbitrary value, such as zero, $100,000 or –$100,000. "Relative" thresholds may be defined as some value which is a function of some variable such as inflation or current earnings. For example, a relative threshold could be six months future estimated living expenses, or a percentage of future estimated wages. Alternately, a multi-period success criterion may be used including, by way of example, falling below an arbitrary level or falling below some level for more than one period. This level may be allowed to vary over time. Success criteria may further be a function of leverage levels. Success criteria may further be defined as having "memory" or a "decaying memory." For example, with an "absolute with memory" criterion, a path that dips below the threshold is considered a failure for all subsequent periods. Examples of decaying memory thresholds are described below.

The probability of achieving the goals is determined (step 67). Additionally, the system may plot out an expected distribution of wealth for each period.

Figure 4:
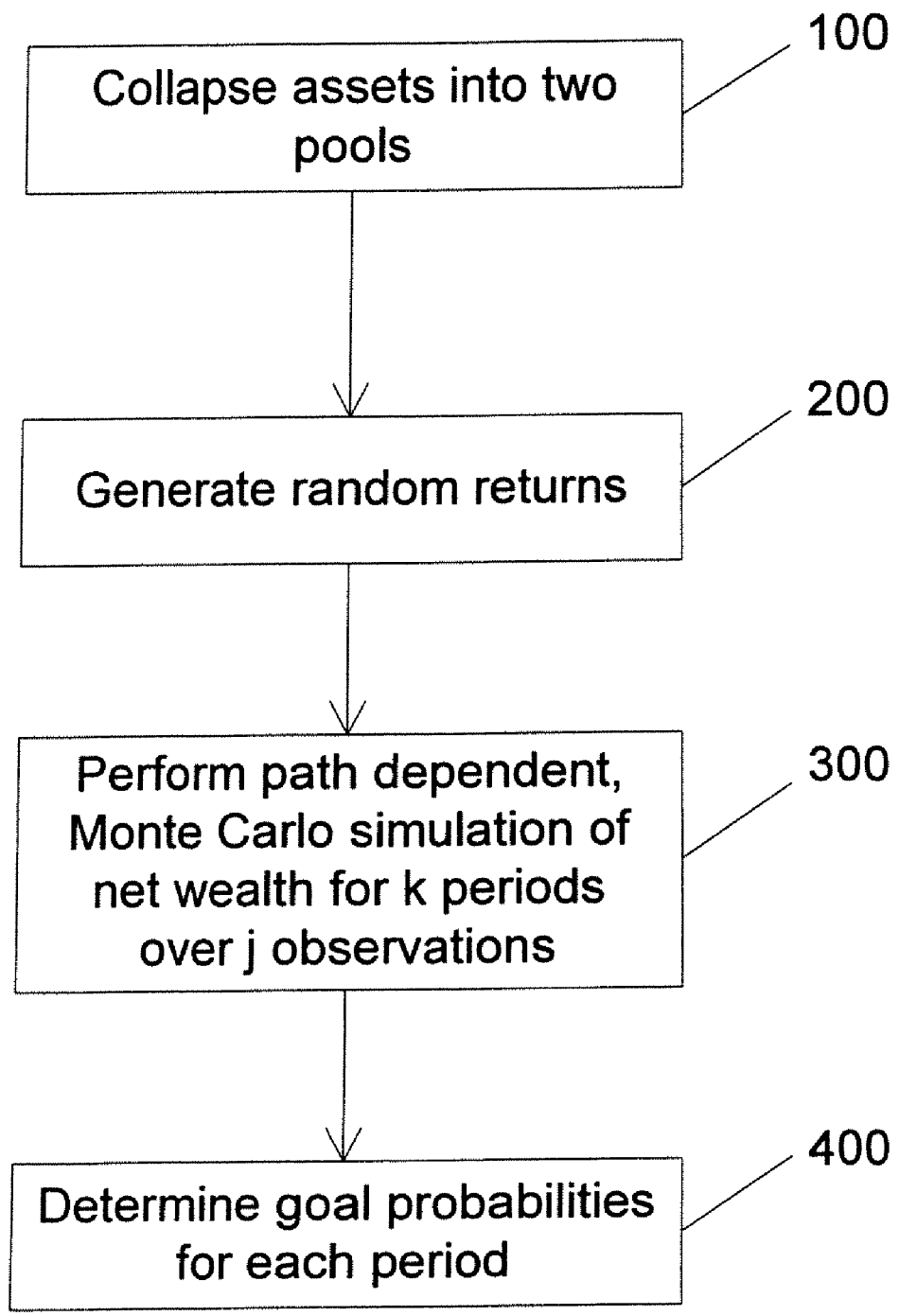
FIG. 4 is a high level flow chart showing a method for collapsing assets into asset pools and calculating probabilities of meeting a defined set of goals in accordance with one embodiment of the present invention.

With reference to FIG. 4, the process of collapsing assets into asset pools, and simulating probabilities of attaining goals, in accordance with one embodiment of the invention is described as follows:

(step 100) collapse the given asset data into two or more pools (e.g. a taxable pool, a tax favored pool, or a concentrated positions pool);

(step 200) generate random returns;

(step 300) perform path dependent, multi-period Monte Carlo simulation using the above random return data for each of the two pools, to calculate net wealth for each period; and (step 400) determine future wealth and goal probabilities for each period, and generate the output statistics.

As noted above, other methods for simulating net wealth for each period may be used in practicing the invention.

Figure 5:
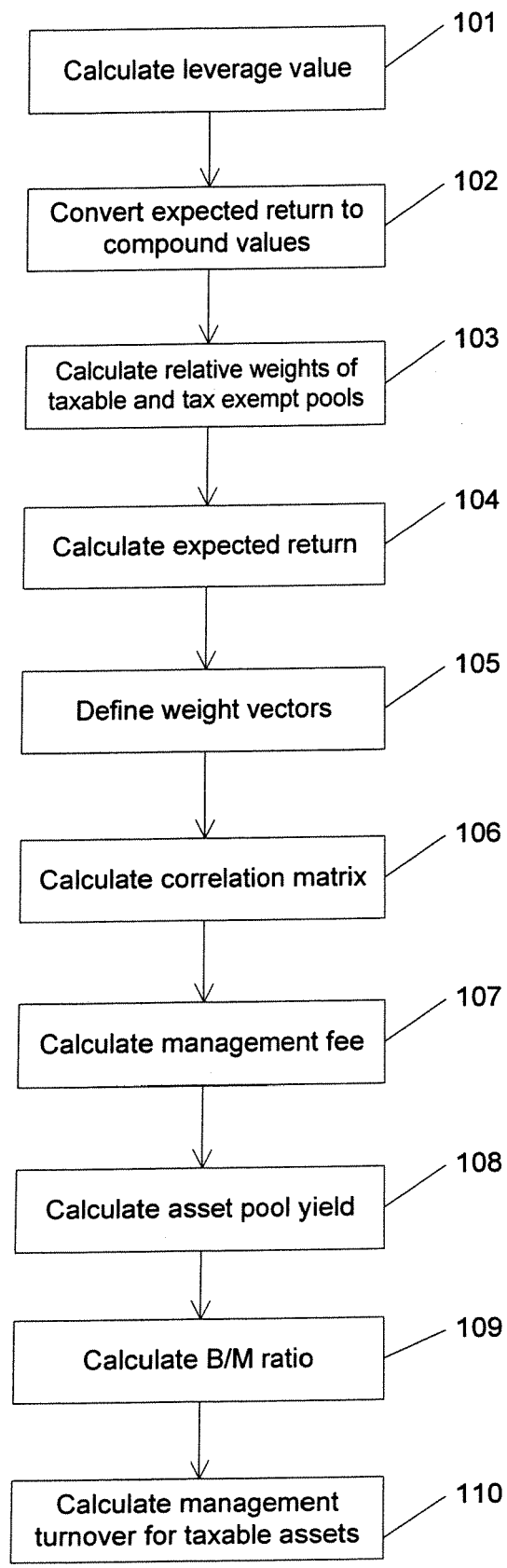
FIG. 5 is a flow chart showing a method of collapsing assets into pools.

With reference to FIG. 5, the process of collapsing assets (step 100) into multiple pools is preferably implemented as follows. All of the given assets in the portfolio are categorized either as taxable or tax deferred assets. All assets belonging to one category are collapsed into a single asset pool having a single expected return, volatility and yield. The process described below assumes a two pool system: a taxable pool and a tax favored pool. As noted above, the tax favored pool may comprise tax exempt and/or tax deferred assets. For the purposes of the description herein, the terms tax favored, tax deferred and tax exempt are used interchangeably, unless noted otherwise. Additional, and/or different, pools, such as a separate pool for one or more concentrated positions, may be used. The expected return, volatility and yield for the collapsed asset pool are calculated as follows:

Calculate (step 101) the leverage value for the tax and tax exempt pools. Leverage is the amount of money borrowed in connection with the portfolio. Leverage allows the portfolio to take negative values. In an advantageous embodiment, only one asset, such as U.S. cash, is allowed to have negative market value in each of the asset pools.

Convert (step 102) the annualized expected return and volatility of the asset pools into continuously compounded values. Calculate (step 103) the relative weights of taxable and tax favored pools. This may be calculated as a function of the sum of the market values of each asset pool. Calculate (step 104) the expected return of each pool. This may be calculated as the weighted mean of all the assets in each pool with positive market values.

The correlation of the pools is calculated (step 106) using a defined set of weight vectors (step 105). The management fee for the asset pools is calculated (step 107), preferably as the weighted (by market values) average of the management fee of the individual assets in that pool.

The yield for the asset pools is calculated (step 108) as the weighted (by market values) average of the individual asset yield values of the assets in that pool. This yield is annualized value.

The system calculates (step 109) the B/M ratio of the asset pool. This may be calculated as the ratio of the sum of market values of the assets to the sum of book values of the assets in that pool.

The management turnover for the tax favored pool is assumed to be zero and for taxable asset pool management turnover is estimated as the turnover for each asset class (step 110).

Figure 6:
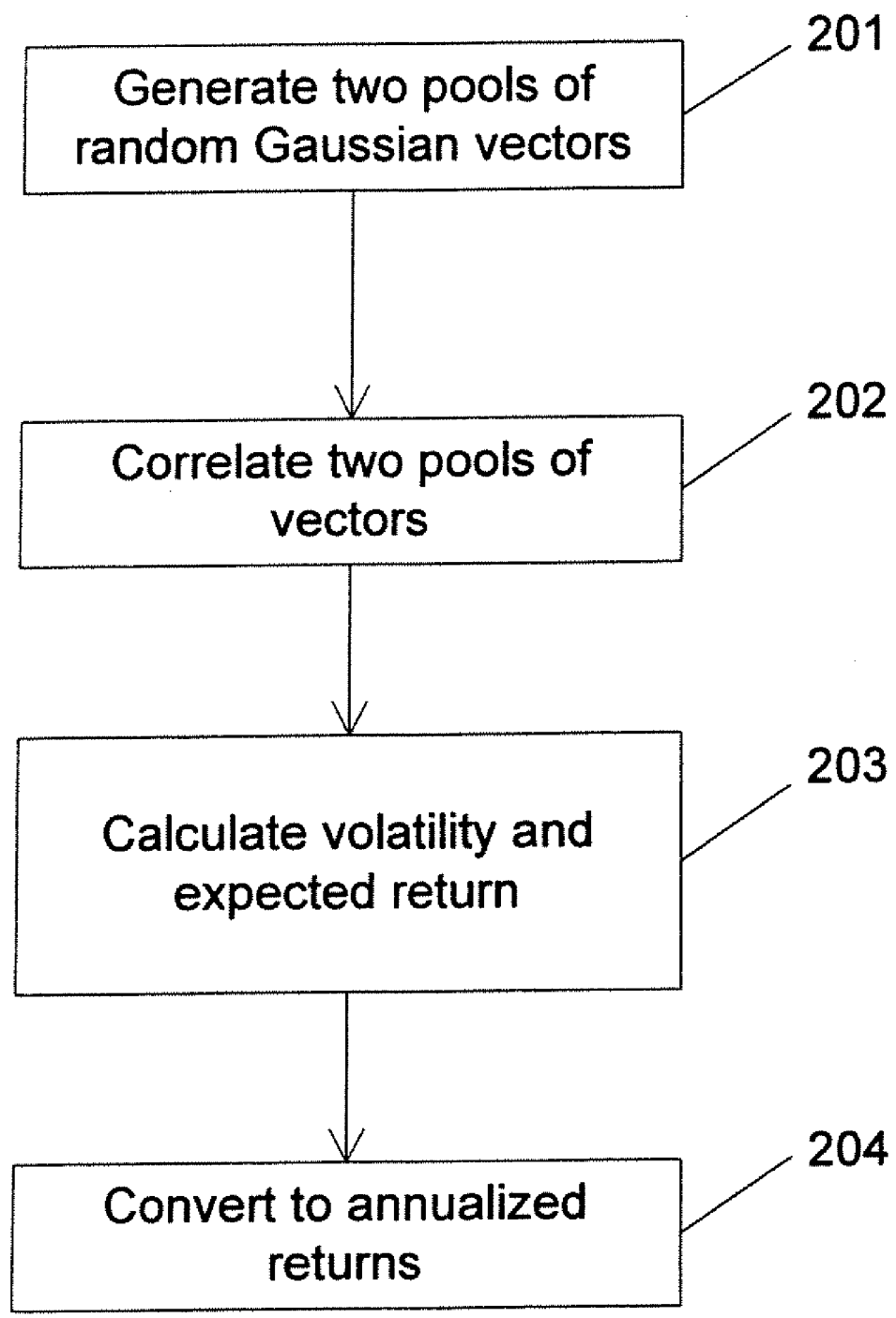
FIG. 6 is a flow chart showing a method of generating random returns.

With reference to FIG. 6, a preferred method for generating random returns (step 200) and simulating multiple paths (step 300) is now described. Those returns are used to simulate correlated random walks for each pool. Two pools of uncorrelated Gaussian random vectors with zero mean and unit variance are generated (step 201), which are then transformed to reflect the mean variance and correlation of each pool. The required volatility and expected return values for each pool is calculated (step 203) based on the type, and concentration, of assets in the pool. The system then simulates (step 204) multiple paths, each of which is one realization of a period of time (k=1–n) that is consistent with the calculated volatility and expected return.

Figure 7:
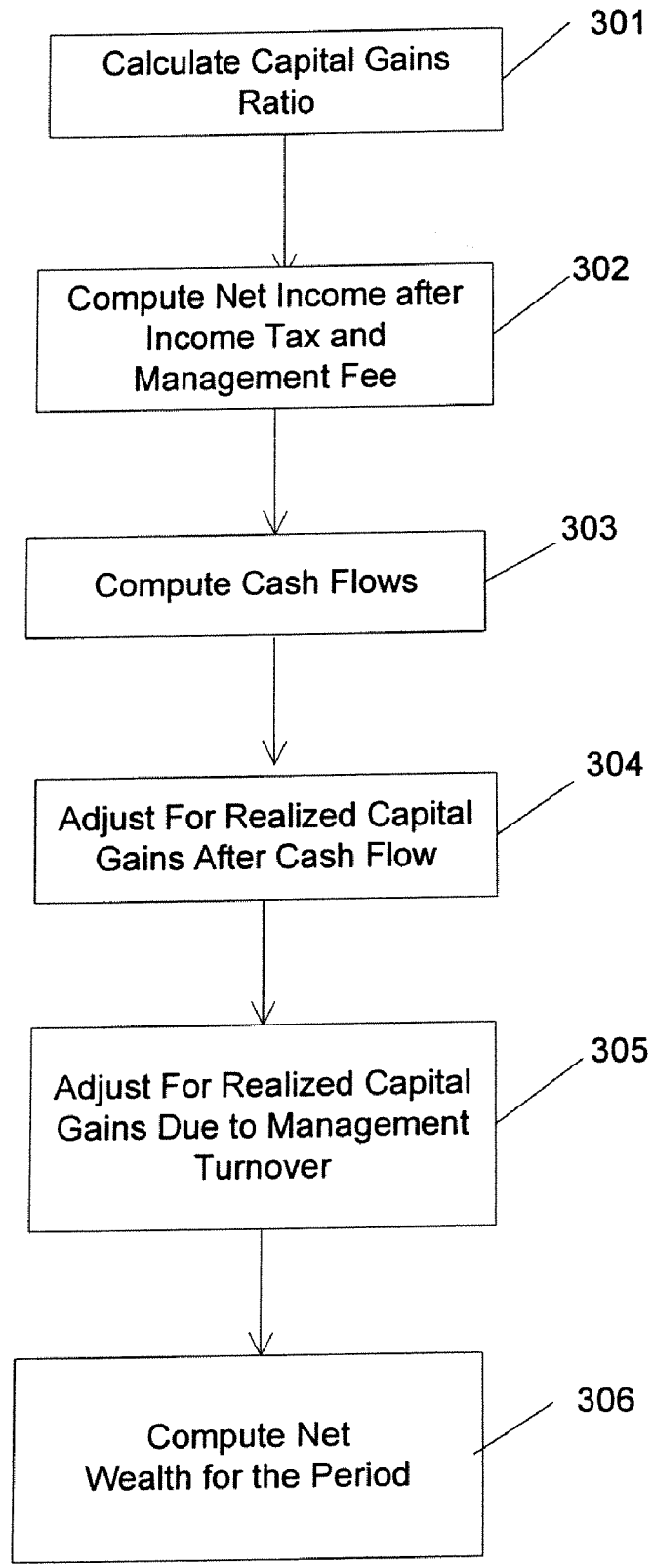
FIG. 7 is a flow chart showing a method of performing Monte Carlo simulation.

With reference to FIG. 7, the preferred method of utilizing a path dependent, multi-period Monte Carlo simulation (step 300) is described. As noted above, alternate simulation techniques may be used in practicing the invention. Thus, the methodology described herein may be used with any asset projection system, as long as wealth value for each period is known for each scenario. For example, instead of a Monte Carlo technique, the system may vary individual parameters, such as equity (high vs. low return) or inflation (high vs. low).

The purpose of simulation step (step 300) is to track how much money each pool would have. In the period-by-period simulation, the wealth computation is based on inflows and outflows, and the amount in each pool. The system preferably tracks how much tax a user would have to pay, how many assets would have to be liquidated, etc.

In order to save computation time, an advantageous embodiment further groups assets into multiple asset classes or pools such as large cap, small cap, etc. However, the invention could be practical using a single class or no classes, in which case assets are examined individually.

Figure 8A:
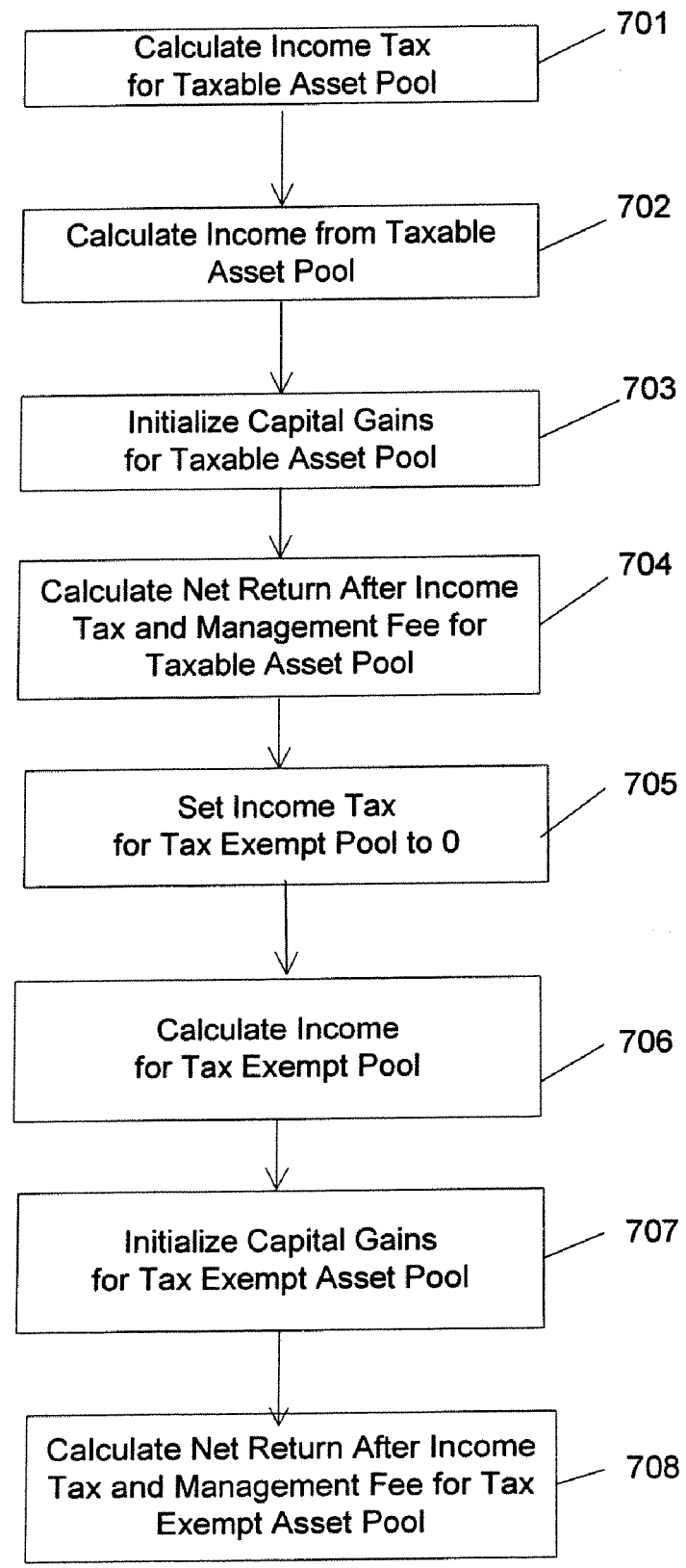
FIG. 8A is a flow chart showing a method of calculating income tax in accordance with the present invention.

The capital gains rate is calculated (step 301) as the expected (treated) return rate–yield. Net income after income taxes and management fees is calculated (step 302). With reference to FIG. 8A, a preferred method for performing income tax calculations is described. Income tax is calculated for the taxable asset pool (step 701). Income from the taxable asset pool is calculated (step 702) as the initial market value*(the yield from taxable asset*(1–tax rate)–the management fee). Accumulated capital gains are initialized (step 702) as zero for the first year and as the initial accumulated capital gains for other periods. Net return after income tax and management fee is calculated (step 704) as rate of return minus income taxes/initial mkt value–management fee.

For the tax exempt pool, income tax is set (step 705) to zero. Income from the tax exempt asset pool is calculated (706) as the initial market value*(the yield from tax exempt asset–the management fee). Accumulated capital gains for the tax exempt asset pool is initialized (step 707). Net return after income tax and management fee is calculated (step 708) as the rate of return–income taxes/initial mkt value–the management fee.

Figure 8B:
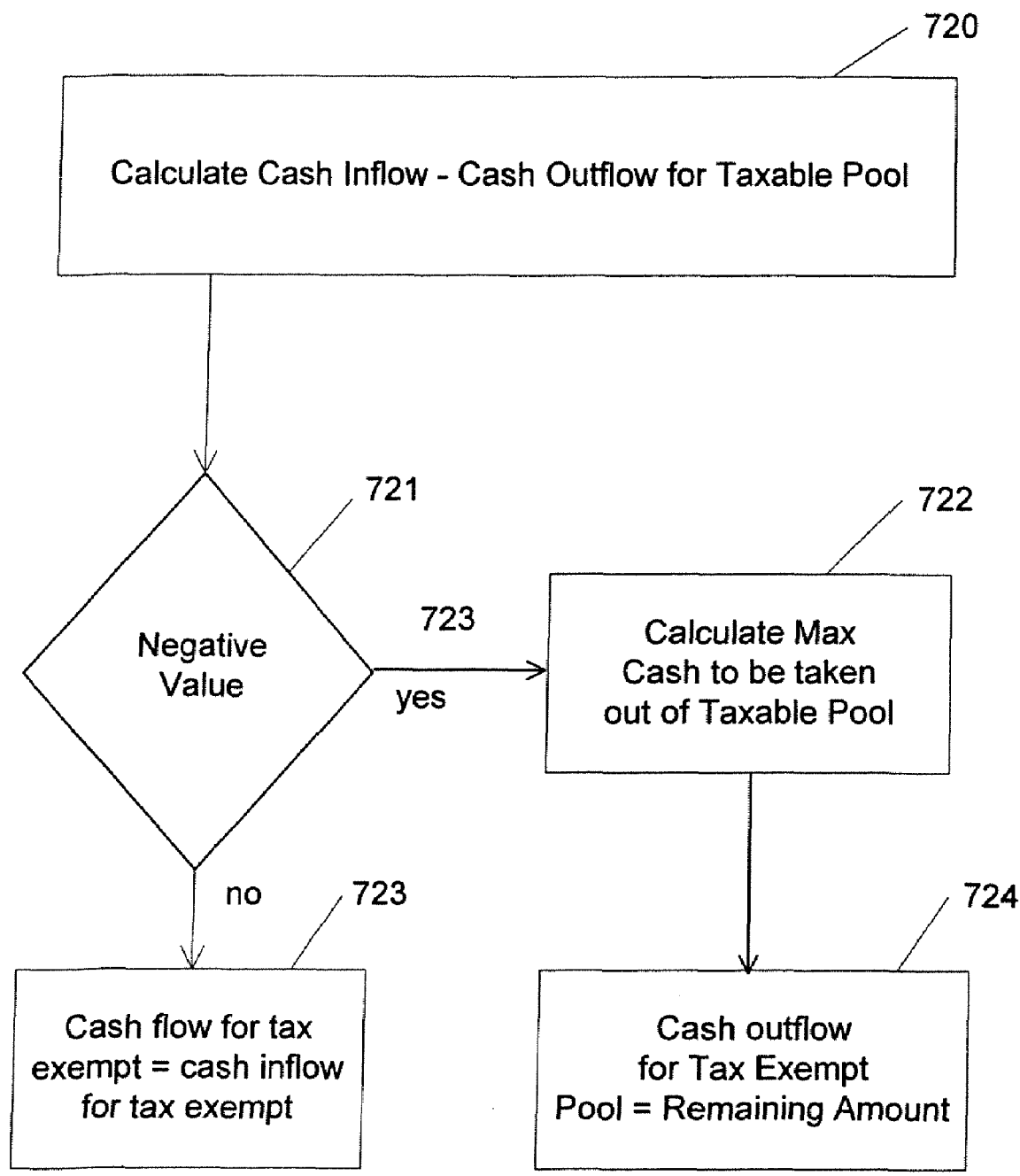
FIG. 8B is a flow chart showing a method of calculating cash flows for multiple asset pools in accordance with the present invention.

With continued reference to FIG. 7, cash flows for the taxable and non-taxable pools are calculated (step 303). With reference to FIG. 8B, a preferred method for performing cash flow calculations is described. Cash outflow from the taxable asset pool is the maximum amount of cash outflow that is possible without making its market value negative, or the actual cash outflow required if this amount is smaller than the maximum outflow that is allowed.

For the taxable pool, total cash flow required is calculated (step 720) as cash inflow into the taxable asset pool–cash outflow from the taxable pool. If this value is negative (step 721), then the maximum amount of cash that can be taken out from the taxable pools is calculated (step 722).

For the tax exempt pool, if all the cash outflow required can be accommodated from the taxable pool, cash flow is equal to the cash inflow into the tax exempt pool for that period (step 723). Otherwise cash outflow for the tax exempt pool is equal to this remaining amount (step 721).

Figure 8C:
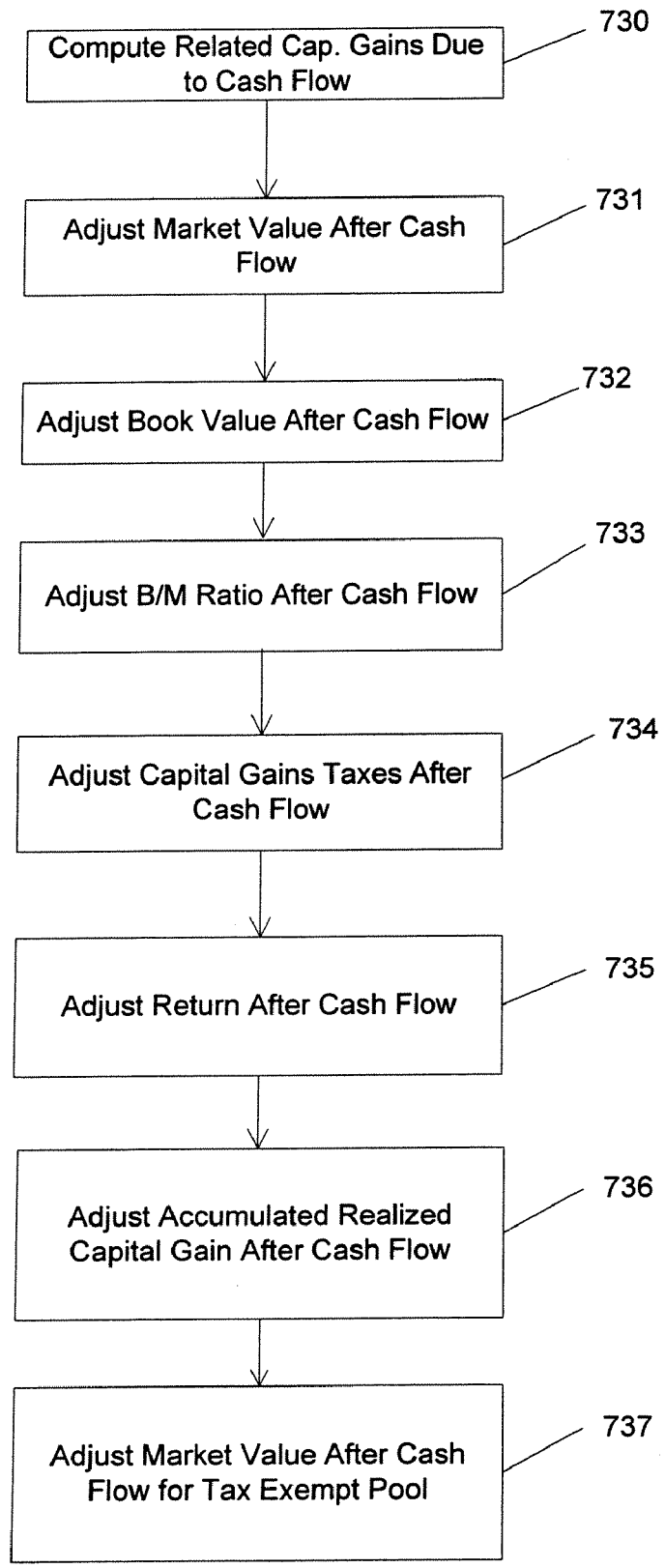
FIG. 8C is a flow chart showing a method of adjusting for realized capital gains.

With continued reference to FIG. 7, realized capital gains after cash flow are calculated (step 304). With reference to FIG. 8C a preferred method of calculating realized capital gains, and adjusting other variables, is described. For the taxable asset pool, realized capital gains due to cash flow are computed (step 720), market value after personal cash flow is adjusted (step 731), book value after personal cash flow is adjusted (step 732), B/M ratio after personal cash flow is adjusted (step 733), capital gains taxes after cash flow is adjusted (step 734), return after cash flow is adjusted (step 735), and accumulated realized capital gains after cash flow is adjusted (step 736).

For the tax exempt pool, only market value is of interest. Market value after cash flow for the tax exempt pool is adjusted (step 737). Capital gains after cash flow, and return after cash flow, are set.

Figure 8D:
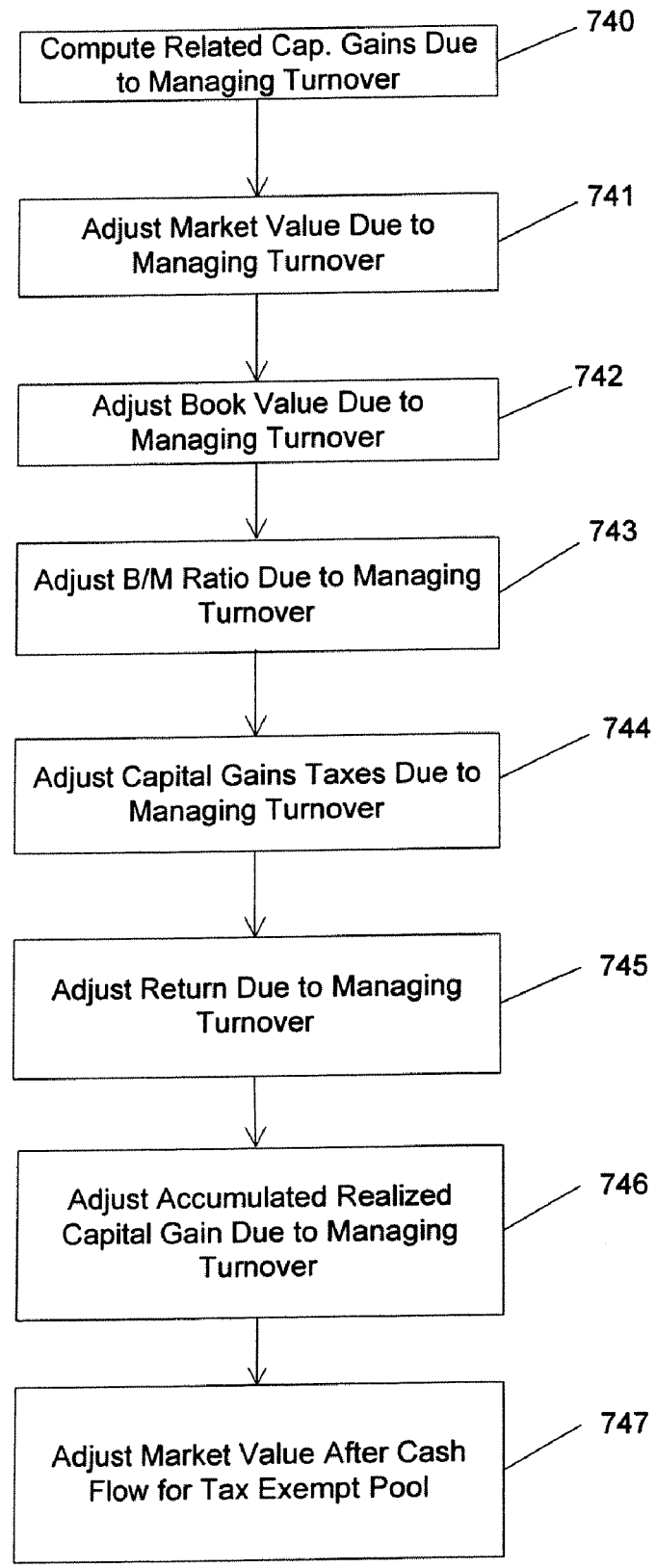
FIG. 8D is a flow chart showing a method of adjusting for realized capital gains due to management turnover.
Figure 9:
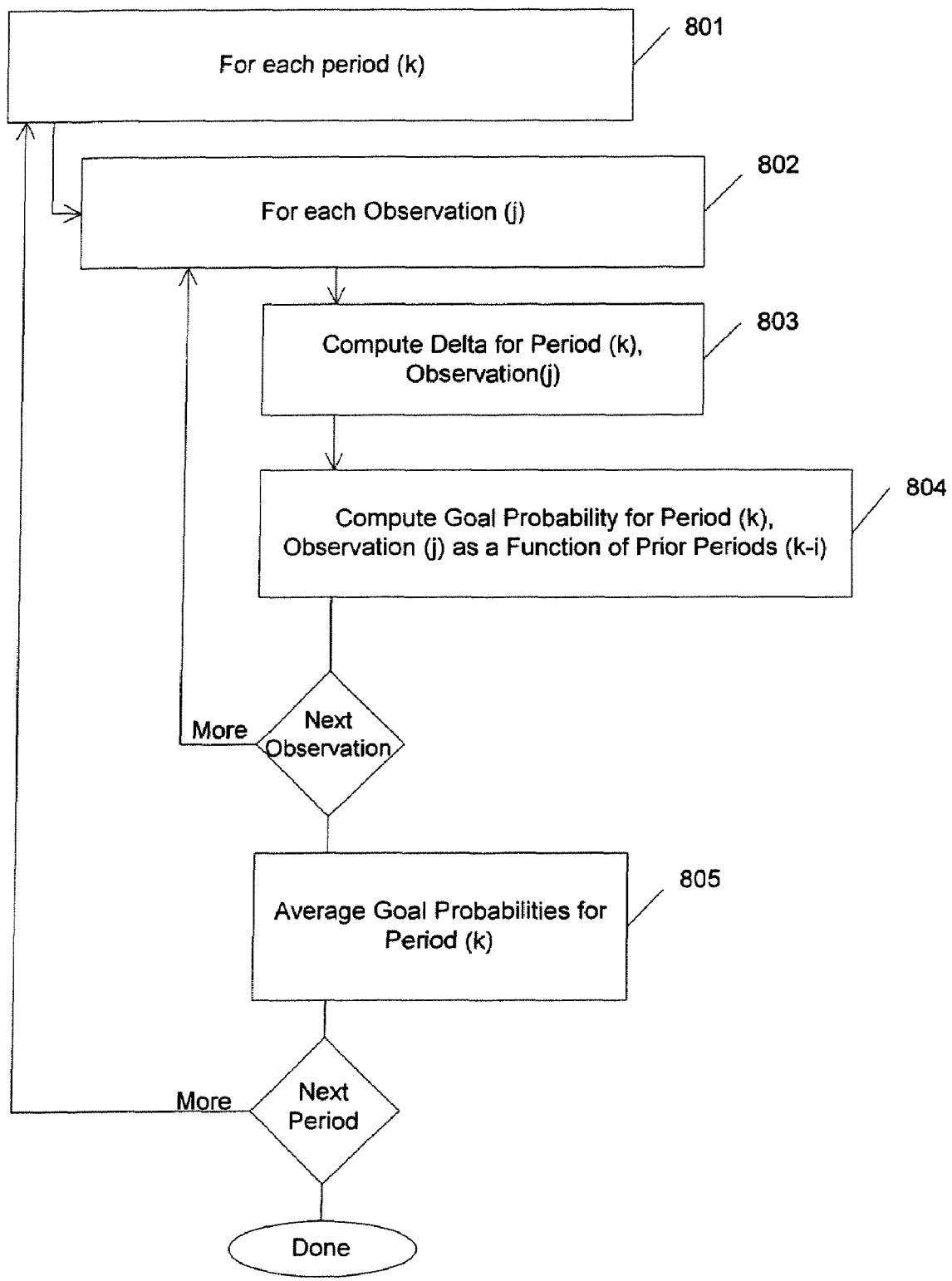
FIG. 9 is a flow chart showing a method of computing goal probabilities in accordance with the present invention.

With continued reference to FIG. 7, realized capital gains due to management turnover are calculated (step 305). With reference to FIG. 8D a preferred method for performing this calculation and adjusting other variables is described.

For the taxable pool, realized capital gains due to management turnover is calculated (step 740) as (1–book/market ratio after client cash flow)*market value after cash flow*managing turnover; market value after managing turnover is adjusted (step 741) as the market value after clients cash flow–capital gains tax paid; book value after management turnover is adjusted (step 742) as the book value after cash flow+realized capital gain after cash flow; B/M ratio is adjusted (step 743); capital gains taxes (step 744), return is adjusted (step 745), and accumulated capital gains (step 746) are adjusted.

Since managing turnover for the tax exempt pool is taken as zero, the above calculations are not necessary for the tax exempt pool.

With continued reference to FIG. 7, net wealth for the period is calculated (step 306). For the case when there is no leverage, net worth of the portfolio during period (k) is the sum of the market value after management turnover for the taxable assets plus the market value after the client's personal cash flow for the tax exempt pool (since the management turnover for the tax exempt pool is taken as zero). If the net wealth for a period is negative, then for the subsequent periods the portfolio is not evolved using the random returns. Instead, the market values are set to zero and the net wealth is added to the leverage.

In the case where there is leverage, the leverage is evolved at a multiple of the US cash return rate. This process is continued until the total leverage plus the total cash flow turns positive. When this is happens, the cash flows are reduced by the leverage amount, the leverage value is set to zero and the portfolio is evolved normally. Thus, for the case where there is leverage, net wealth for the period is calculated as the market value after managing turnover for the taxable pool, plus market value after the client's personal cash flow for the tax exempt pool, plus the total leverage for the period.

With reference back to FIG. 4, after performing Monte Carlo simulation to determine net worth for each period (k), goal probability for each period is computed. In the preferred embodiment goal probability is computed as follows. First, a delta function for each period (k) (step 801) for each observation (j) (step 802) is computed (step 803). Preferably the delta function is equal to one if net worth satisfies the success criterion and zero if not.

Next, the goal probability for each period (k), for each observation (j), is calculated (step 804) as a function of whether the client met the success criterion for prior periods (k-i). In the following advantageous formula, a decaying four year memory for negative net worth paths is used. This version does not "penalize" a client's current goal probabilities (i.e., decrease the calculated probability that the client will achieve goals) for having had a negative net worth more than four years ago. As will be apparent to those of skill in the art, other functions or values may be used.

$$g_{pk_j} = \frac{\sum_{i=0}^{3} \frac{\delta p(k-i)j}{(i+l)^2}}{\sum_{i=0}^{3} \frac{1}{(1+i)^2}}$$

Goal probability for a period (k) is averaged (step 805) over a number of observations (j). Preferably, this is over n=400 observations. This may be increased, for concentrated positions, or if the volatility is high. This may be expressed as:

$$g_{pk} = \frac{\sum_{j=1}^{400} g_{pk_j}}{400}$$

Although the present invention was discussed in terms of certain preferred embodiments, the description is not limited to such embodiments. Rather, the invention includes other embodiments including those apparent to a person of ordinary skill in the art. Thus, the scope of the invention should not be limited by the preceding description but should be ascertained by reference to the claims that follow.

What is claimed is:

1. A computer system of determining the probability that a financial goal expressed as a cash outflow will be met, comprising:
   (a) a database including:
      (i) a set of assets associated with a user, said assets associated with a market value; and
      (ii) a criterion for success associated with said user, said criterion for success associated with a plurality of periods; and
   (b) a programmed processor configured to:
      (i) simulate a plurality of market scenarios on said assets, each said scenario adjusting said market value of said assets for each said period;
      (ii) apply said criteria for success to each said scenario; and
      (iii) calculate the probability said user will satisfy said associated criteria for success.

* * * * *